United States Patent
Kondo et al.

(10) Patent No.: US 6,917,440 B2
(45) Date of Patent: Jul. 12, 2005

(54) IMAGE OUTPUT SYSTEM CAPABLE OF APPROPRIATELY PROVIDING PRINTING SERVICE FOR FREE OR SMALL CHANGE

(75) Inventors: Shoji Kondo, Kawasaki (JP); Fumio Inoue, Akashi (JP)

(73) Assignee: Minolta Co., Ltd., Osaka (JP)

( * ) Notice: Subject to any disclaimer, the term of this patent is extended or adjusted under 35 U.S.C. 154(b) by 860 days.

(21) Appl. No.: 09/775,821

(22) Filed: Feb. 5, 2001

(65) Prior Publication Data

US 2002/0039193 A1 Apr. 4, 2002

(30) Foreign Application Priority Data

Sep. 29, 2000 (JP) .................................... 2000-298625

(51) Int. Cl.$^7$ .......................... G06K 15/02; G06F 3/12; G06F 13/00
(52) U.S. Cl. ..................................... 358/1.15; 358/1.14
(58) Field of Search ................................. 358/1.1–1.18, 358/527, 537, 538, 540, 437, 452, 453, 462

(56) References Cited

U.S. PATENT DOCUMENTS 5,991,409 A * 11/1999 Windel et al. ................ 705/62
6,690,824 B1 * 2/2004 Stringa ....................... 382/176

FOREIGN PATENT DOCUMENTS

| JP | 10-126733 | 5/1998 |
| JP | 11-126021 | 5/1999 |
| JP | 2000-357071 | 12/2000 |

* cited by examiner

*Primary Examiner*—Douglas Tran
(74) *Attorney, Agent, or Firm*—Burns, Doane, Swecker & Mathis, L.L.P.

(57) ABSTRACT

A search is conducted through a registered large advertising list to judge whether there are at least two large ad advertisers with credit of at least one in the large ad list. If not, free printing is inhibited. If so, a search is made for small ad advertisers to check if there are at least three small ad advertisers with credit of at least one. If not, free printing is inhibited. If so, free printing is allowed. In this way, an image output system can be provided capable of producing a high image quality print with a sub image added thereto at no charge or a small charge by imposing a certain limit.

13 Claims, 34 Drawing Sheets

F I G. 1 0
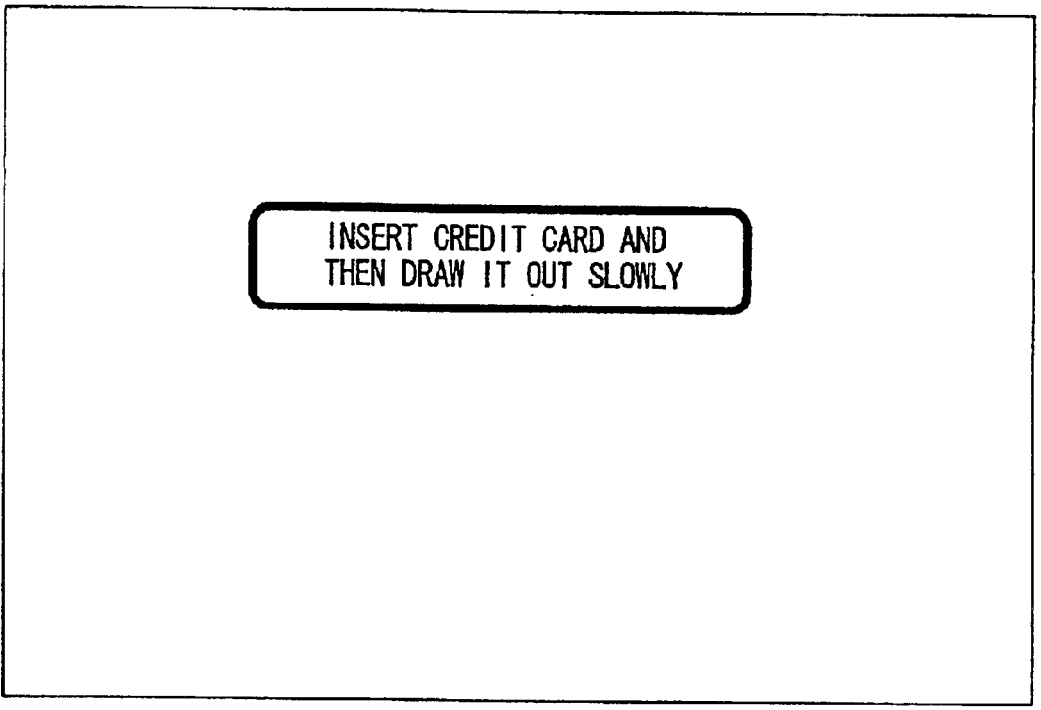

F I G. 11

THANK YOU FOR AD APPLICATION. PLEASE INPUT REQUEST ITEMS CONCERNING AD.

AD SIZE [LARGE] [SMALL]

PRINT NUMBER [100 SHEETS ¥1000] [200 SHEETS ¥2000] [300 SHEETS ¥3000] [400 SHEETS ¥4000] [500 SHEETS ¥5000] [1000 SHEETS ¥10000]

TARGET CUSTOMER
SEX [ALL] [MALE] [FEMALE]
AGE [ALL] [10~] [20~] [30~] [40~] [50~] [60~]
OCCUPATION [ALL] [STUDENT] [OFFICE WORKER] [PUBLIC SERVICE] [FREELANCE] [AGRICULTURE] [DISEMPLOYMENT]
MARRIAGE [ALL] [UNMARRIED] [MARRIED]

CONTACT PHONE NO.   INPUT BY TEN-KEY

PHONE NO. DISPLAY SECTION

[7] [8] [9]
[4] [5] [6]
[1] [2] [3]
[0] [CLEAR]

AD INPUT METHOD [SCANNER INPUT] [KEY INPUT]

INPUT COMPLETED ? [INPUT COMPLETED] [SUSPEND OPERATION]

F I G. 13
FEE IS ¥1000
THIS FEE IS CHARGED TO YOUR CREDIT CARD
 ACCEPT
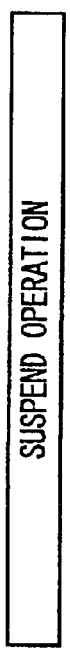 SUSPEND OPERATION

FIG. 14

THANK YOU

FIG. 15
FEE IS ¥1000
AD CONTENTS WILL BE EXAMINED AND INSERTED UPON APPROVAL.
UPON APPROVAL, THE FEE ABOVE IS CHARGED TO CREDIT CARD
ACCEPT
SUSPEND OPERATION

FIG. 19

THANK YOU FOR AD APPLICATION. PLEASE INPUT REQUEST ITEMS CONCERNING AD.

| AD SIZE | | LARGE | SMALL | | | |
|---|---|---|---|---|---|---|
| PRINT NUMBER | 100 SHEETS ¥1000 | 200 SHEETS ¥2000 | 300 SHEETS ¥3000 | 400 SHEETS ¥4000 | 500 SHEETS ¥5000 | 1000 SHEETS ¥10000 |

TARGET CUSTOMER
| SEX | ALL | MALE | FEMALE | | | |
|---|---|---|---|---|---|---|
| AGE | ALL | 10~ | 20~ | 30~ | 40~ | 50~ | 60~ |
| OCCUPATION | ALL | STUDENT | OFFICE WORKER | PUBLIC SERVICE | FREELANCE | AGRICULTURE | DISEMPLOYMENT |
| MARRIAGE | ALL | UNMARRIED | MARRIED | | | |

DESIRED AD PHOTO KIOSK
| ALL | 001 | 002 | 003 | 004 | 005 |
|---|---|---|---|---|---|
| XX UNIVERSITY | OPEN-AIR MARKET | XX STATION | XX HALL | YY STATION | ZZ UNIVERSITY |

CONTACT PHONE NO. _____

MALE ADDRESS _____

INPUT COMPLETED ?   INPUT COMPLETED    SUSPEND OPERATION

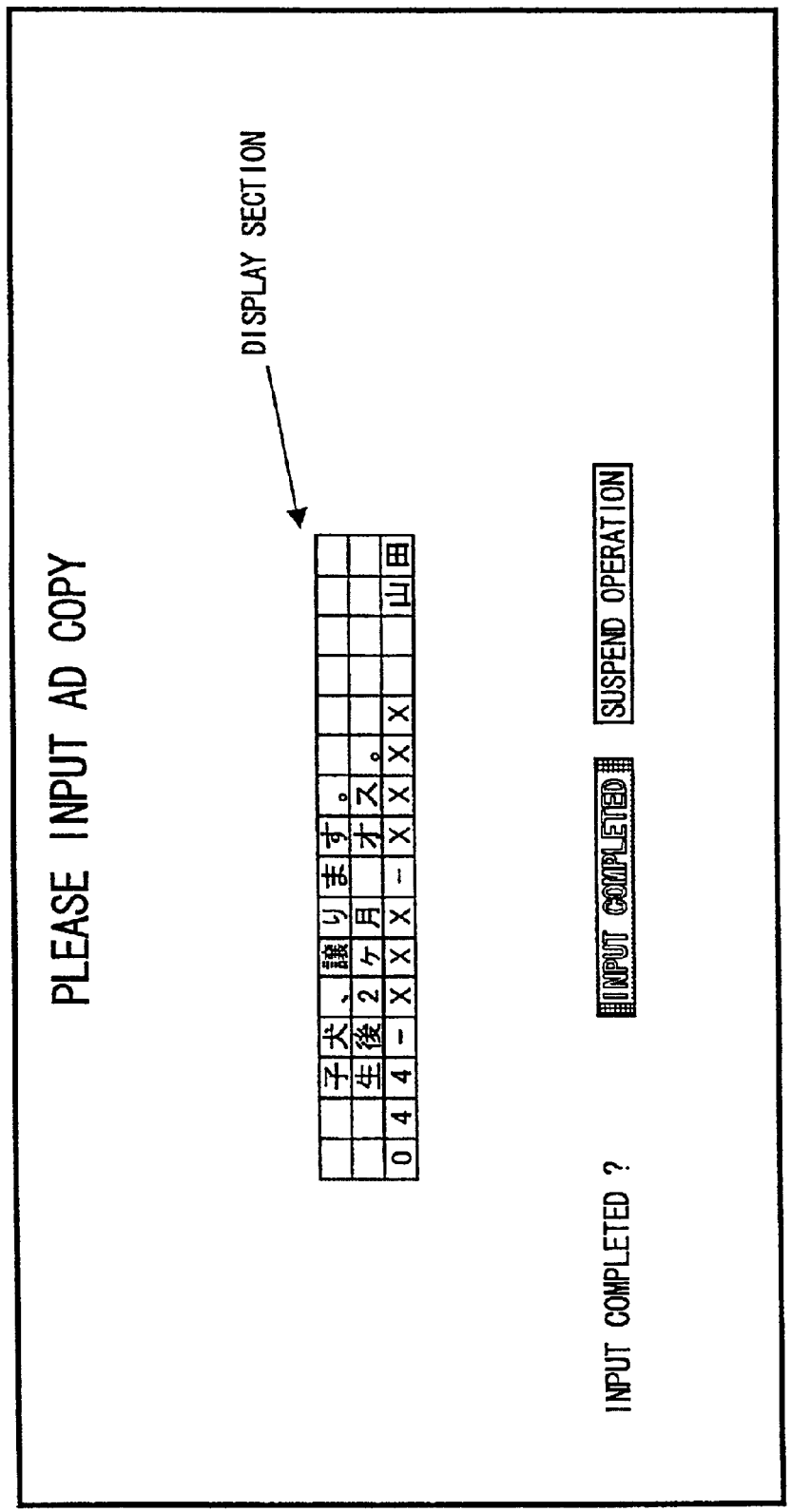

FIG. 22
FEE IS ¥1000
AD CONTENTS WILL BE EXAMINED AND INSERTED UPON APPROVAL
UPON APPROVAL, THE FEE ABOVE IS CHARGED TO CREDIT CARD
ACCEPT
SUSPEND OPERATION

FIG. 23

| AD NUMBER | ADVERTISER | CREDIT | SEX | AGE | OCCUPATION | MARRIAGE |
|---|---|---|---|---|---|---|
| L1001 | SAKURA TRAVEL | 1000 | ALL | ALL | ALL | ALL |
| L1002 | HOME TUTOR DISPATCH SERVICE | 1000 | ALL | ALL | ALL | ALL |
| L1003 | YURIGAOKA MARKET | 1000 | ALL | ALL | ALL | ALL |
| L1004 | AOZORA DRIVING SCHOOL | 500 | ALL | ALL | ALL | ALL |
| L1005 | KIMURA PHOTO STUDIO | 500 | ALL | ALL | ALL | ALL |
| L1006 | RENTAL RECORD | 1000 | | | | |
| . | . | . | . | . | . | . |
| . | . | . | . | . | . | . |
| . | . | . | . | . | . | . |

F I G. 24

| AD NUMBER | ADVERTISER | CREDIT | SEX | AGE | OCCUPATION | MARRIAGE |
|---|---|---|---|---|---|---|
| S1001 | YAMADA MATERNITY AND GYNECOLOGICAL HOSPITAL | 500 | FEMALE | ALL | ALL | ALL |
| S1002 | RENTAL FIELD | 100 | ALL | 30~ | ALL | ALL |
| S1003 | TENNIS SCHOOL | 100 | ALL | ALL | ALL | ALL |
| S1004 | PLEASE BE PUPPY OWNER | 100 | ALL | ALL | ALL | ALL |
| S1005 | CONVENIENCE STORE | 500 | ALL | ALL | ALL | ALL |
| S1006 | FLOWER SHOP | 500 | ALL | ALL | ALL | ALL |
| ... | ... | ... | ... | ... | ... | ... |

F I G. 25

| | | | | | |
|---|---|---|---|---|---|
| SEX | MALE | FEMALE | | | |
| AGE | 10~ | 20~ | 30~ | 40~ | 50~ | 60~ |
| OCCUPATION | STUDENT | OFFICE WORKER | PUBLIC SERVICE | FREELANCE | AGRICULTURE | DISEMPLOYMENT |
| MARRIAGE | MARRIED | UNMARRIED | | | | |

INPUT COMPLETED ?

COMPLETED   CANCEL

F I G. 26

IF YOU HAVE MEMORY CARD, PLEASE INSERT
IT INTO SLOT OF CARD READER

IF YOU HAVE FLOPPY DISK, PLEASE INSERT
IT INTO FLOPPY DRIVE

IF YOU HAVE CD-ROM, PLEASE INSERT IT
INTO CD-ROM DRIVE

FIG. 31

NUMBER OF PRINTS ?

| 1 | ② | 3 | 4 | 5 |
¥100 ¥200 ¥300 ¥400 ¥500

FEE IS ¥200

PLEASE INSERT CASH OR CREDIT CARD

FIG. 34

THIS IS THE LIMIT OF FREE PRINT

WE ARE EXPECTING YOUR FUTURE VISIT

| FREE PRINT | < AD1 > | < AD2 > | < AD3 > | < AD4 > | < AD5 > |
|---|---|---|---|---|---|
| 1 | L1001 | L1002 | S1001 | S1002 | S1003 |
| 2 | L1002 | L1003 | S1002 | S1003 | S1004 |
| 3 | L1003 | L1004 | S1003 | S1004 | S1005 |
| 4 | L1004 | L1005 | S1004 | S1005 | S1006 |
| 5 | L1005 | L1006 | S1005 | S1006 | S1001 |

IMAGE OUTPUT SYSTEM CAPABLE OF APPROPRIATELY PROVIDING PRINTING SERVICE FOR FREE OR SMALL CHANGE

This application is based on application No. 2000-298625 filed in Japan, the contents of which is hereby incorporated by reference.

BACKGROUND OF THE INVENTION

1. Field of the Invention

The present invention relates to image output systems. In particular, the invention relates to an image output system printing an image taken by a digital camera with a sub image such as an advertisement added thereto for appropriately providing printing service without charge or at a low rate.

2. Description of the Related Art

Digital cameras have been widely prevailing at a dramatic speed in recent years. In general, an image taken by a digital camera is received by a computer and printed out by a printer connected to the computer. A problem then arises of a high cost of creating a print image like the one produced by the conventional silver halide photography.

Owing to improved performance of ink jet printers for home use, a print image with the quality of photographs can be obtained even at home. However, such a high quality image requires dedicated print sheets. As the dedicated print sheets are expensive, the print cost accordingly increases.

Some DPE (Development Printing Enlargement) shops offer a service of printing digital images taken by digital cameras. This service can be used to obtain a print image with a photographic image quality. However, the print cost is still high compared with that for the conventional silver halide photographs.

In order to overcome the problem with regard to cost, a system could be possible that provides a printing service with advertising added to a print image. Specifically, an advertiser requiring effective advertising media pays for printing in return for advertising added to the print image. In this way, a user requiring printing of an image of a digital camera can receive a print image without charge or for a significantly small charge.

Advertisers such as medium and small stores in towns, local group activities, volunteer groups, other groups performing activities within a limited budget and the like, can expect great advertising effects at a low cost by utilizing this system, different from those from expensive newspaper and TV advertising.

Even such a system of offering printing service as described above is inappropriate in terms of management of the system if this system unlimitedly provides printing service.

Specifically, since advertisers bear the print cost, the free or low rate printing service is difficult to provide unless an advertisement income obtained from payment by the advertisers exceeds a certain amount. Excessive printing service is also inappropriate that is provided above the limit put by the advertisers concerning printout such as the number of prints to be made, size of advertising, and the like. In addition, a large number of prints that are mischievously made and a large number of prints ordered by the same user, if not from mischief, are against the intention of the advertisers who make payment hoping for greater advertising effects.

SUMMARY OF THE INVENTION

The present invention is made in consideration of these circumstances. One object of the present invention is to provide an image output system capable of more appropriately providing a print image of a high quality with a sub image added thereto at no charge or a small charge by imposing a limit to a certain degree.

The object of the invention is achieved by an image output system including the following components. Specifically, according to one aspect of the invention, the image output system includes a registration unit registering sub image data from an advertiser, an acquisition unit acquiring main image data from a user, a reception unit receiving a print output request, a first output unit according to the received print output request to print out the acquired main image data and the registered sub image data on the same medium, a decision unit deciding whether a predetermined number of sub image data are registered in the registration unit, and a limitation unit limiting the printing out by the first output unit if the decision unit decides that the predetermined number of sub image data are not registered in the registration unit.

According to the present invention, the main image data and the sub image data are printed out on the same medium in accordance with the print output request from the user. The cost for this printing is paid by the advertiser offering the sub image data. The user can thus obtain a print image of high quality at no charge or a small charge. If a predetermined number of sub image data are not registered in the registration unit, limitation is imposed on printing out of the sub image data and the main image data on the same medium. Accordingly, free printing or printing at a low rate is limited when the printing cost borne by the advertiser exceeds an amount payable by the advertiser, and thus printing service can be provided more appropriately.

In this way, it is possible to provide an image output system capable of more properly producing a high image quality print with a sub image added thereto at no charge or a small charge by imposing a certain limitation.

Preferably, the print output request received by the reception unit includes the number of sub image data printed out together with the main image data by the first output unit. The first output unit prints out the sub image data together with the main image data based on the number of sub image data.

According to the invention, based on the number of sub image data requested by the user, the first output unit prints out the main image data and the requested number of sub image data on the same medium. Then, it is possible to offer the image output service meeting users' requests to a higher degree.

Preferably, the image output system further includes a charging unit charging a fee to the user. The charging unit charges the fee according to the number of sub image data printed out by the first output unit.

According to the present invention, a fee is charged to the user in accordance with the number of sub image data that are printed out. A proper fee can thus be charged to the user following the user's request.

Preferably, the image output system further includes a second output unit printing out only the acquired main image data on the medium.

According to the invention, only the main image data is printed out by the second output unit on the medium. Regular printing is possible even when output of sub image data is not desired, which increases options and improves ease of use.

Preferably, the image output system further includes a charging unit charging a fee to the user. The charging unit charges for printing by the second output unit a fee greater than a fee charged for printing out by the first output unit.

According to the present invention, a higher rate is charged to the user when only the main image data is printed out, compared with the fee for printing out the main image data together with the sub image data. The user can then enjoy the print out service providing printing of the sub image from the advertiser, at a smaller charge than that for regular printing by which only the main image data is output.

Preferably, information about whether output is allowed or not is attached to the registered sub image data. The sub image data printed out by the first output unit has information added thereto that indicates allowance of output.

According to the invention, only the sub image data to which attached information indicating allowance of output is printed out by the first output unit. Even if the predetermined number of sub image data are registered in the registration unit, sub image data having attached information indicating that output is not allowed is never printed out. Service of printing out data can thus more appropriately be offered in a possible range with sub image data added thereto.

According to another aspect of the invention, an image output system includes a registration unit registering sub image data from an advertiser, a limit information acquisition unit acquiring information about limitation on printing out regarding the registered sub image data, a main image data acquisition unit acquiring main image data from a user, a reception unit receiving a print output request, an output unit according to the received print output request to print out the acquired main image data and the registered sub image data on the same medium, a decision unit deciding whether the printing out by the output unit is within a range of the acquired information about limitation on printing out, and a limitation unit limiting the printing out by the output unit if the decision unit decides that the printing out is out of the range of the information about limitation.

According to the present invention, the main image data and the sub image data are printed out on the same medium following the print output request from the user. The cost for this printing is paid by the advertiser offering the sub image data. Then, the user can obtain a high quality print image at no charge or a small charge. Further, information is acquired about limitation on the number of times the sub image data is output, the output size of the sub image data and the like. If the printing out of the sub image data and the main image data on the same medium is out of the range of the information about the limitation, the output is restricted. Printing out can thus be carried out properly according to the acquired information about limitation.

In this way, limitation is imposed to a certain degree, and thus an image output system can be provided that is capable of more properly producing a print of high image quality to which sub image is added at no charge or a small charge.

Preferably, the information about limitation acquired by the limit information acquisition unit includes the number of times the printing out is performed by the output unit.

According to the invention, when the number of times the sub image data is printed out, which is acquired as information about limitation, is exceeded, printing out by the output unit is restricted. Printing out is then conducted a proper number of times which the advertiser requests.

Preferably, the image output system further includes a charging unit charging a fee to the advertiser. The charging unit charges a fee according to the acquired information about limitation.

According to the invention, a fee is charged to the advertiser in accordance with the information about limitation imposed by the advertiser such as the number of times output is done and the like. Charging can be done more appropriately following the intention of the advertiser.

According to still another aspect of the invention, an image output system includes a registration unit registering sub image data from an advertiser, an acquisition unit acquiring main image data from a user, a reception unit receiving a print output request, a first output unit according to the received print output request to print out the acquired main image data and the registered sub image data on the same medium, a decision unit deciding whether the number of times the printing out by the first output unit is performed for the same user reaches a predetermined number, and a limitation unit limiting the printing out by the first output unit if the decision unit decides that the predetermined number is reached.

According to the present invention, following the print output request from the user, the main image data and the sub image data are printed out on the same medium. The cost for this printing is paid by the advertiser offering the sub image data. The user can thus obtain a print image of high quality without charge or at a low rate. Further, when the number of times the sub image data and the main image data for the same user are printed out on the same medium reaches the predetermined number, the printing out is limited. Then, it is possible to prevent a great number of prints for the same user from being produced and accordingly provide more effective advertising that satisfies intentions of the advertiser.

In this way, it is possible to provide an image output system capable of more properly providing a high image quality print with a sub image added thereto without charge or at a small charge, by imposing limitation to a certain degree.

Preferably, the image output system further includes a receptacle unit receiving a recording medium on which main image data is recorded. The acquisition unit acquires main image data from the recording medium received by the receptacle unit. If the main image data is acquired from the same recording medium received by the receptacle unit, the decision unit recognizes that the main image data is from the same user, and decides whether the number of times the printing out is performed reaches the predetermined number based on the recognition.

According to the invention, if the main image data is acquired from the same recording medium, the main image data is considered as the one from the same user. When the number of times output is performed for the same user reaches the predetermined number, printing out by the first output unit is restricted. It is then possible to accurately decide if the same user provides the main image data and accordingly limit printing out more appropriately.

Preferably, the image output system further includes a second output unit printing out only the acquired main image data on the medium. When the printing out by the first output unit is limited by the limitation unit, printing out is done by the second output unit.

According to the present invention, if output by the first output unit printing out the main image data and the sub image data on the same medium is limited, only the main image data can be printed on the medium by the second output unit. Owing to this, even if output by the first output unit is limited, the entire printing is not limited and main image data can still be printed out like done by the regular printing.

Preferably, the image output system further includes a charging unit charging a fee to the user. The charging unit charges for printing by the second output unit a fee greater than a fee charged for printing out by the first output unit.

According to the invention, a higher rate is charged to the user when only the main image data is printed out, compared with the fee for printing out the main image data together with the sub image data. The user can then enjoy the print out service providing printing of the sub image from the advertiser, at a smaller charge than that for regular printing out by which only the main image data is output.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 10 shows a screen displayed on the touch panel monitor for instruction to insert a credit card.

FIG. 11 shows a screen displayed on the touch panel monitor for input of requests concerning advertising.

FIG. 13 shows a payment confirmation screen displayed on the touch panel monitor.

FIG. 14 shows a final screen displayed on the touch panel monitor.

FIG. 15 shows a second payment confirmation screen displayed on the touch panel monitor.

FIG. 19 shows a screen displayed on the client computer for input of requests concerning advertising.

FIG. 20 shows a screen displayed on the client computer for input of advertising copies.

FIG. 22 shows a second payment confirmation screen displayed on the client computer.

FIG. 23 exemplarily shows a list of large advertisements registered in the photo kiosk apparatus.

FIG. 24 exemplarily shows a list of small advertisements registered in the photo kiosk apparatus.

FIG. 25 shows a screen displayed on the client computer for input of user information.

FIG. 26 shows a screen displayed on the touch panel monitor for instruction to insert a card or the like.

FIG. 31 shows a screen displayed on the touch panel monitor for input of the number of prints to be made.

FIG. 34 shows a screen displayed on the touch panel monitor for inhibiting free printing from being carried out in the free print mode.

DESCRIPTION OF THE PREFERRED EMBODIMENTS

Figure 1:
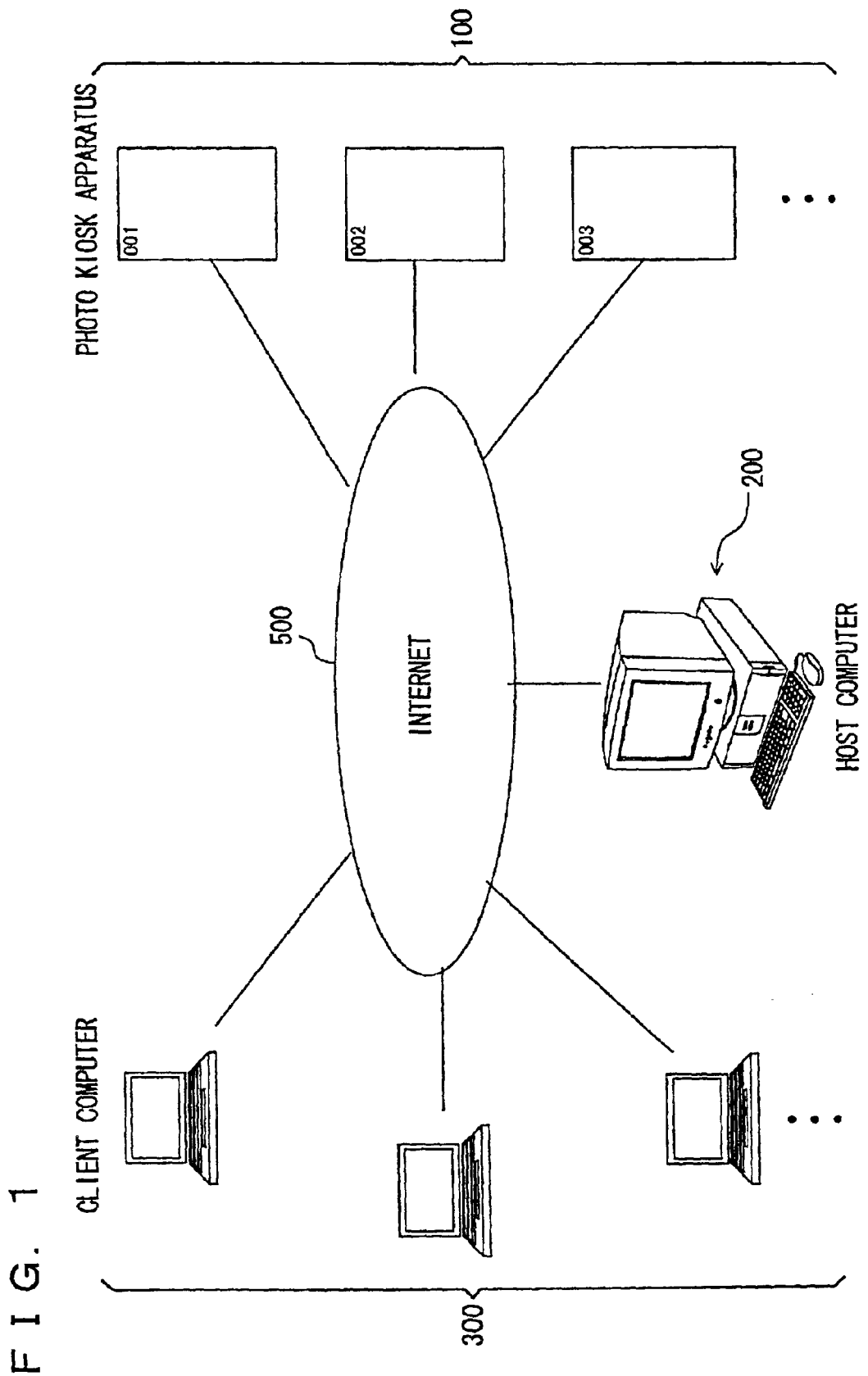
FIG. 1 shows a network structure according to an embodiment of the present invention including a photo kiosk apparatus connected to Internet.

An embodiment of the present invention is now described in conjunction with the drawings. Referring to FIG. 1, a photo kiosk apparatus 100, a client computer 300 for an advertising applicant, and a host computer 200 for a manager of photo kiosk apparatus 100 are connected to Internet 500.

The manager of photo kiosk apparatus 100 offers a homepage for an ad applicant to register advertising. The ad applicant can then access from client computer 300 the homepage of host computer 200 to register advertising in a desired photo kiosk apparatus 100 by means of the home page.

It is noted that the ad applicant can visit the place where photo kiosk apparatus 100 is located and directly register advertising.

Photo kiosk apparatus 100 and host computer 200 communicate with each other in real time or at predetermined time intervals for those processes of additional registration of new advertising, confirmation of the registration, and the like.

Figure 2:
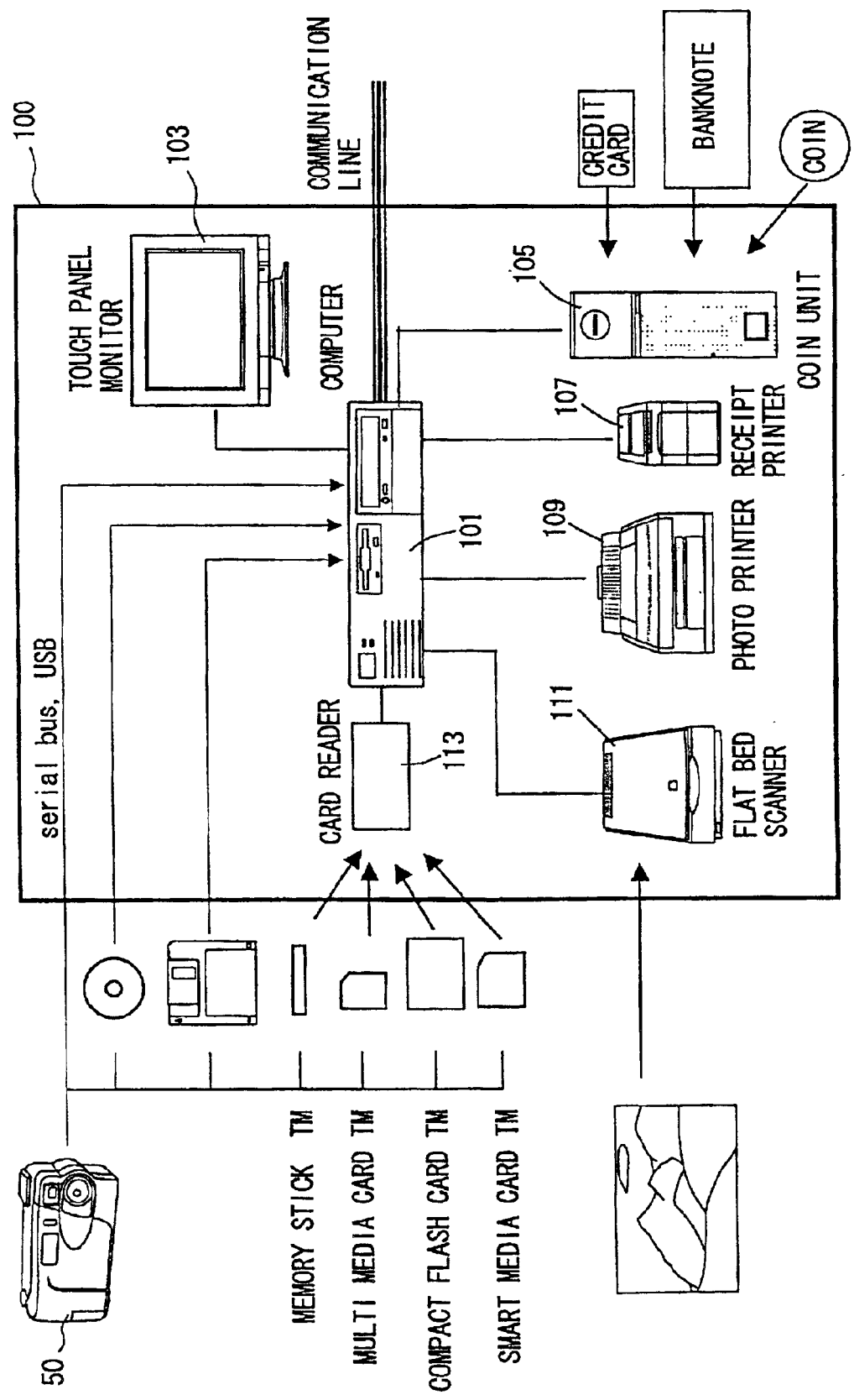
FIG. 2 illustrates an entire structure of the photo kiosk apparatus according to the embodiment.
Figure 3:
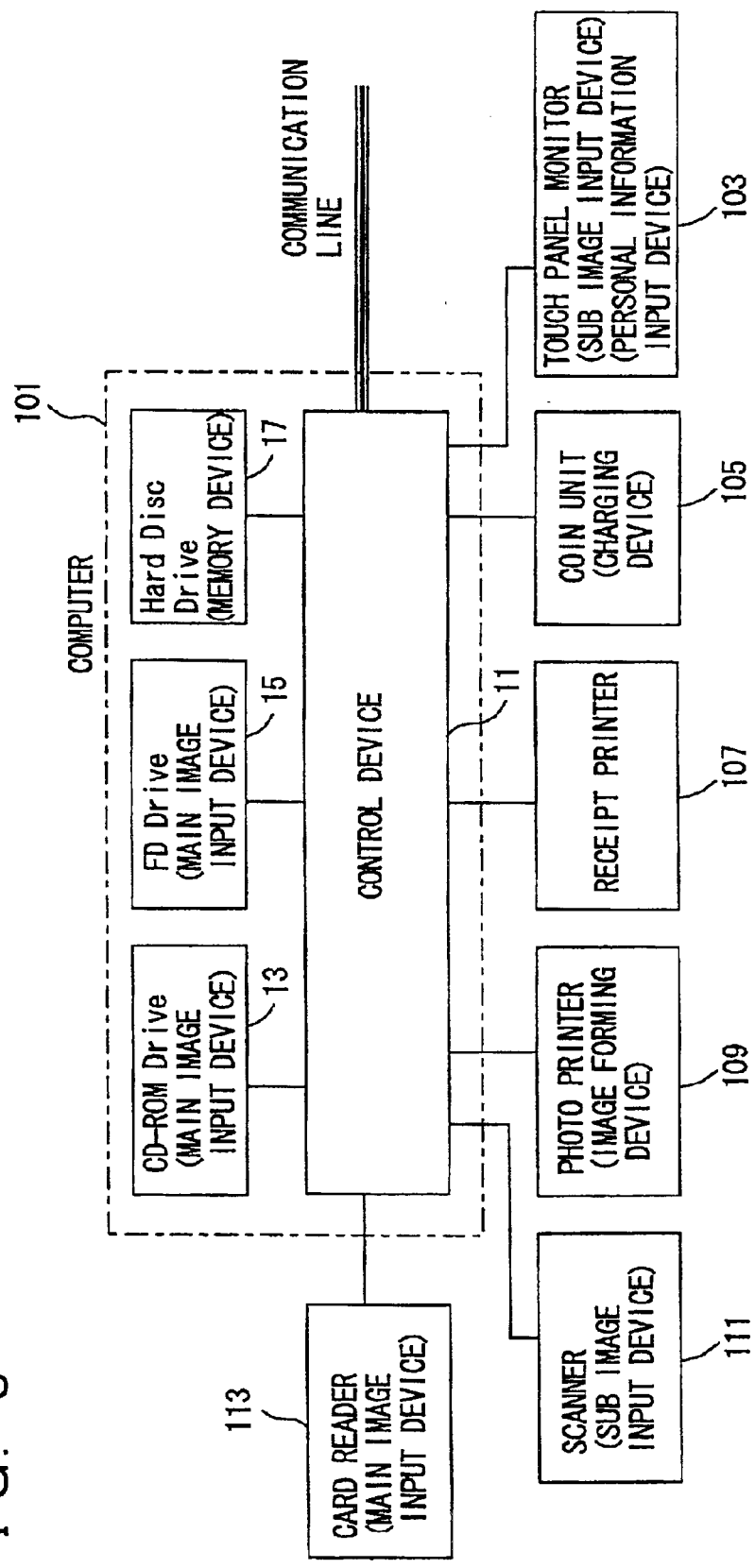
FIG. 3 is a functional block diagram of the photo kiosk apparatus showing in detail a computer in FIG. 2.

A structure of photo kiosk apparatus 100 according to this embodiment is described in conjunction with FIGS. 2 and 3.

FIG. 2 illustrates an entire structure of photo kiosk apparatus 100 in this embodiment and FIG. 3 is a functional block diagram of photo kiosk apparatus 100 showing in detail a computer 101 in FIG. 2.

Referring to FIGS. 2 and 3, photo kiosk apparatus 100 is constituted of computer 101 at the center, a touch panel monitor 103, a coin unit 105, a receipt printer 107, a photograph printer 109, a flat bed scanner 111, and a card reader 113.

Computer 101 includes a control device 11 for controlling the entire apparatus, a CD-ROM drive 13, a floppy disk drive 15, and a hard disk drive 17. Computer 101 is connected to host computer 200 via a communication line.

Touch panel monitor 103 provides a user interface to advertising applicants (advertisers) and users who request printing out of a taken image. The monitor indicates messages for operation and receives instructions input by an operator touching the monitor.

Coin unit 105 is provided for permitting operation of photo kiosk apparatus 100 and receives banknotes, coins, prepaid cards, credit cards and the like.

A thermal printer, for example is employed as receipt printer 107 to issue receipts to users. A parallel interface or USB is used for connection with computer 101.

A high image quality printer is used as photograph printer 109 that can print an image taken by a digital camera 50 with a photographic quality. Specifically, any of sublimation type printer, ink jet printer, electrophotograph printer, silver halide printer and the like may be employed. A parallel interface or USB is used for connection with computer 101.

Flat bet scanner 111 is used for entering an image brought by an advertiser into computer 101. Connection with computer 101 is implemented by an SCSI interface, parallel interface, or USB.

Card reader 113 reads information stored in memory cards such as memory stick, multimedia card, smart media card, and compact flash card (all of them are registered trade names) and outputs the information to computer 101. Connection with computer 101 is implemented by an SCSI interface or USB.

An image taken by digital camera 50 can be stored in a floppy disk or CD-ROM to be entered directly in computer 101 by inserting the floppy disk or CD-ROM into floppy disk drive 15 or CD-ROM drive 13 without passing it through card reader 113. Further, image data can directly be entered by connecting digital camera 50 to computer 101 by a serial bus or USB.

Hard disk drive 17 stores advertisements registered by advertisers, advertisements transmitted via communication lines, and predetermined information concerning each of the advertisements.

Photo kiosk apparatus 100 has two modes, i.e., pay print mode and free print mode. The pay print mode provides regular printing. Specifically, a user pays a normal fee, ¥100 per sheet for example as printing cost. In this case, a desired image provided by the user is printed on the entire surface of a print sheet as regularly done.

The free print mode provides a print made with an advertising image added thereto. Specifically, in addition to a taken image provided by a user, an advertising image stored in advance in a predetermined area of hard disk drive 17 is printed on one print sheet. In this case, an advertiser providing the advertising image pays the printing cost. Consequently, the user may pay a small fee (or nothing or any fee sufficient to show that the user is a bona fide user, for example, approximately ¥10 per sheet).

Figure 4:
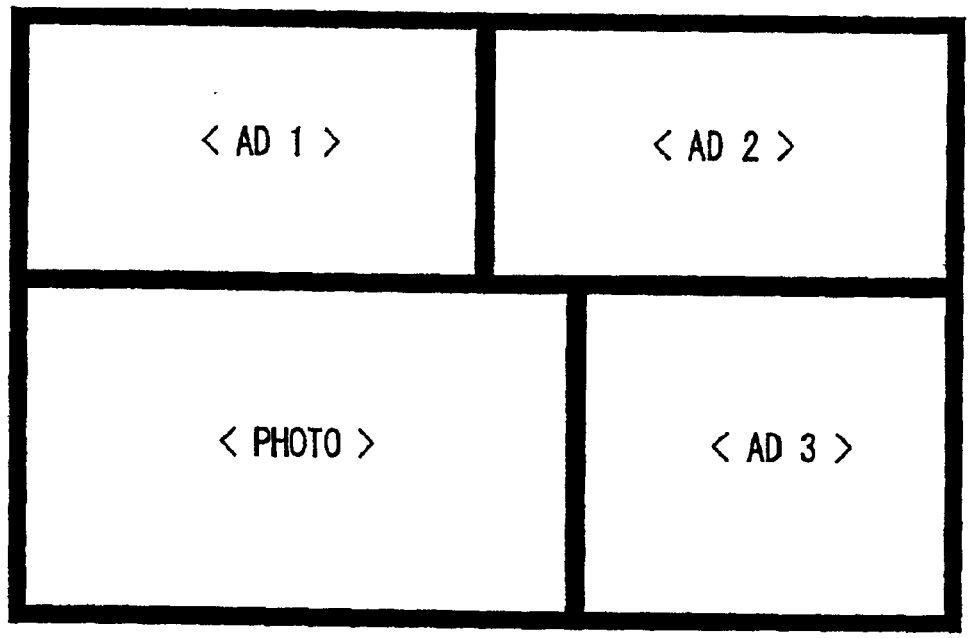
FIG. 4 exemplarily shows a first layout in a free print mode.
Figure 5:
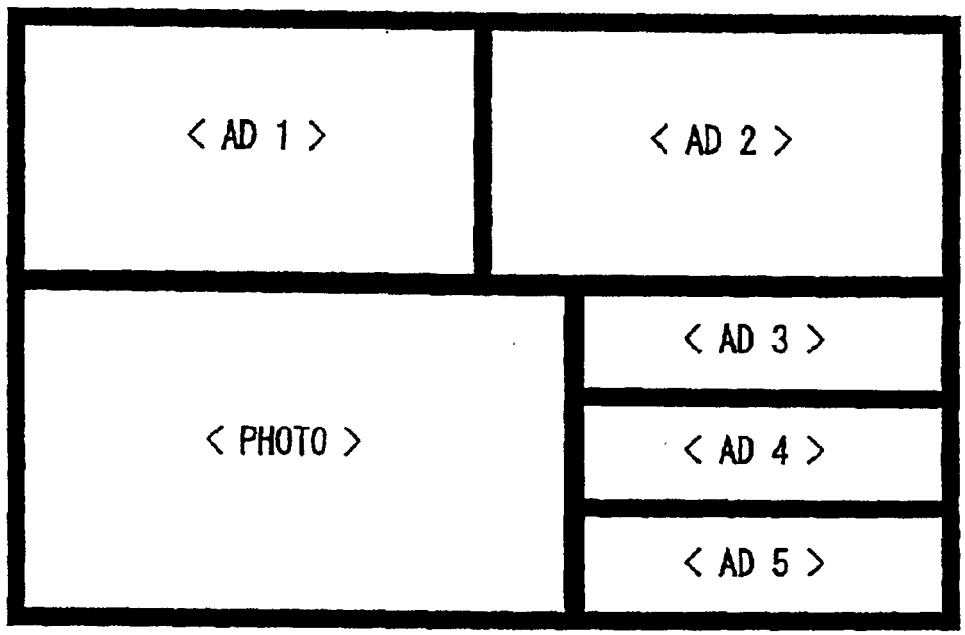
FIG. 5 exemplarily shows a second layout in the free print mode.

FIGS. 4 and 5 respectively show exemplary layouts for printing in the free print mode. A first layout shown in FIG. 4 includes a <photo> area on the lower left as well as three advertising areas of approximately the same size, i.e., <ad 1>, <ad 2> and <ad 3> areas, that are arranged on one print sheet. A photograph selected by a user is printed on the <photo> area while advertisements registered in advance are printed respectively on the ad areas.

A second layout shown in FIG. 5 includes a plurality of ad areas different in size from each other that are arranged on one print sheet. In this way, it is possible to meet requests of various advertisers.

Specifically, the second layout includes <ad 1> and <ad 2> areas as large ad areas and <ad 3>, <ad 4> and <ad 5> areas as small ad areas. <Ad 1> and <ad 2> areas are identical in size while <ad 3>, <ad 4> and <ad 5> areas are identical in size.

In the discussion below concerning the free print mode, the second layout (FIG. 5) is referred to that has the large and small ad areas.

Figure 6:
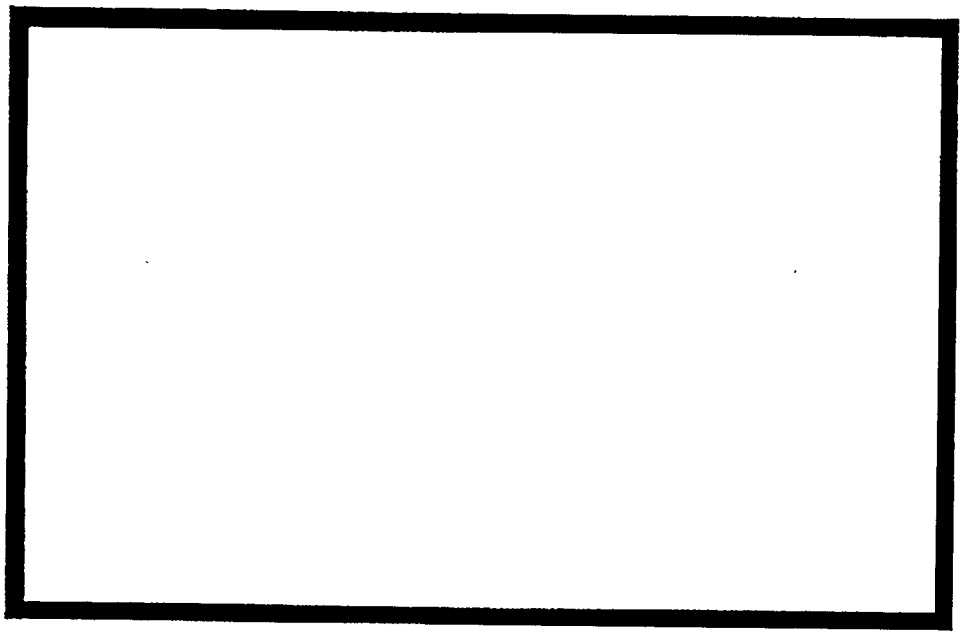
FIG. 6 exemplarily shows a layout in a pay print mode.
Figure 7:
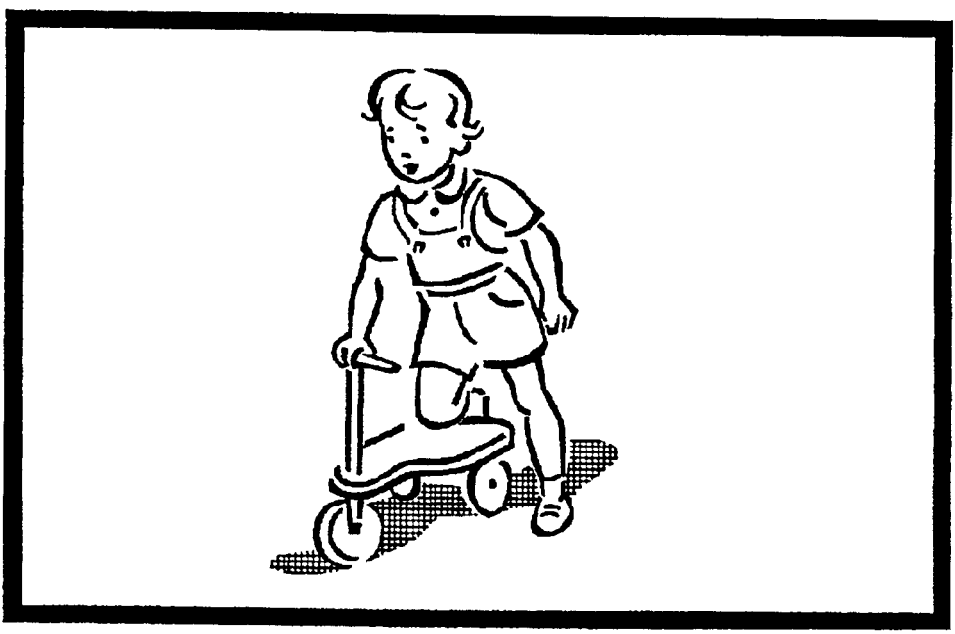
FIG. 7 exemplarily shows a regular print made in the pay print mode.

In the pay print mode, as shown in FIG. 6, an image selected by a user from taken images stored in a memory card or the like is normally printed on the entire surface of a print sheet. Consequently, as shown in FIG. 7, a normal print image is produced as an output image.

Figure 8:
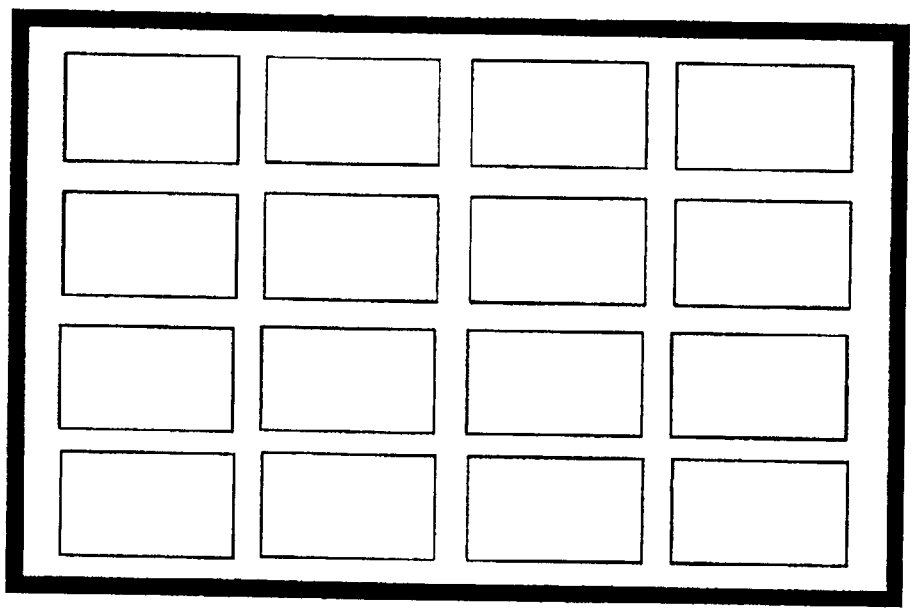
FIG. 8 exemplarily shows an index print in the pay print mode.

It is noted that the pay print mode also allows a plurality of images to be printed on one print sheet as shown in FIG. 8. In the case of such an index print, a predetermined number of (e.g. 16) images stored in a memory card or the like are printed as one set on the entire surface of the print sheet.

Details of a procedure for registering advertising in photo kiosk apparatus 100 are now described. An advertiser can apply for registration of advertising orally, by phone, facsimile, or Internet to a company managing photo kiosk apparatus 100. Alternatively, the advertiser can visit the place where photo kiosk apparatus 100 is located to apply for registration of advertising by directly operating photo kiosk apparatus 100.

Figure 9:
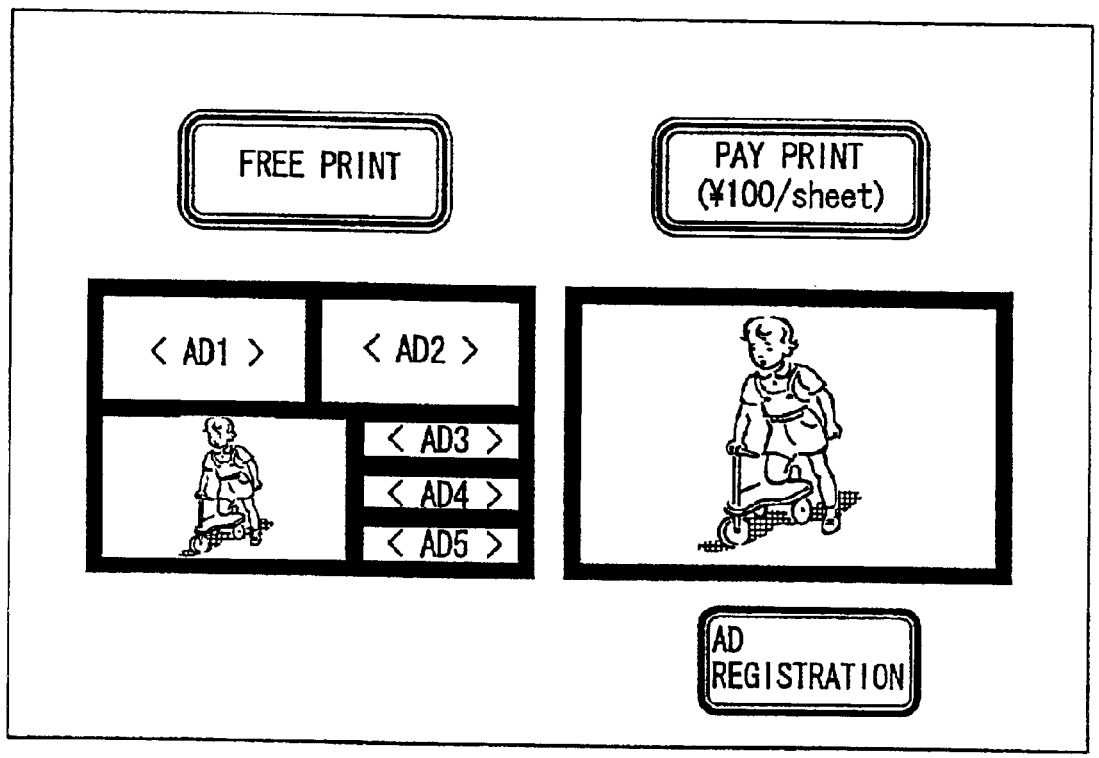
FIG. 9 shows an initial screen displayed on a touch panel monitor of the photo kiosk apparatus.

The following description is on advertising registration by an advertiser directly operating photo kiosk apparatus 100. An initial screen as shown in FIG. 9 is displayed on touch panel 103 of photo kiosk apparatus 100. The initial screen includes a free print switch, a pay print switch and an ad registration switch. These switches are touch switches provided on a CRT.

A sample of a free print is displayed under the free print switch and a sample of a pay print is displayed under the pay print switch.

Touching of the free print switch causes photo kiosk apparatus 100 to enter the free print mode for producing a print of digital data without charge. Touching of the pay print switch causes the apparatus to enter the pay print mode for producing a print of digital data by payment. Touching of the ad registration switch causes photo kiosk apparatus 100 to enter an ad registration mode for registering advertising to be arranged on a free print by direct operation of photo kiosk apparatus 100.

The advertiser requesting registration of advertising touches the ad registration switch on the initial screen. The ad registration switch is touched to display a screen as shown in FIG. 10 indicating a message that a credit card should be inserted.

Following the displayed message "insert credit card and then draw it out slowly," the advertiser inserts a valid credit card into a card insertion slot of coin unit 105 and then slowly pulls it out. It is noted that this request that the credit card should be inserted prior to ad registration intends to prevent any operation out of mischief.

After the credit card is drawn out, a screen as shown in FIG. 11 is displayed. Here, the displayed screen is provided for the advertiser to input request items concerning advertising. As the request items, "ad size," "print number" and "target customer" are displayed, for example, as shown in FIG. 11. In addition to the request items, items necessary for registering advertising such as "contact phone No.," "ad input method" and the like are also displayed.

"Ad size" allows the advertiser to select one of ad sizes, i.e., large size and small size. The large size corresponds to the <ad 1> and <ad 2> areas shown in FIG. 9 and the advertising fee for the large size advertising is ¥40 per print. The small size is approximately one-third of the large size and corresponds to the <ad 3>, <ad 4> and <ad 5> areas shown in FIG. 9. The advertising fee is ¥10 per print.

On the screen as shown, a "small" switch touched by the advertiser who requests a small advertisement is accordingly highlighted.

By using "print number," the advertiser selects the number of advertisements that the advertiser requests. On this screen, print number selection switches corresponding to 100, 200, 300, 400, 500 and 1000 respectively are provided. For reference, respective fees corresponding to those numbers are displayed under respective print number selection switches. Here, as the small advertisement is selected on the upper stage, the fees are calculated based on the unit fee ¥10 per print. If the large ad is selected, respective fees are displayed based on the unit fee ¥40 per print.

The advertiser requests here 100 prints to be produced and thus touches the "100" switch. Consequently, the "100" selection switch is highlighted.

"Target customer" is used to input conditions of target customers for which the advertiser intends to provide advertising. Specifically, those conditions relate to sex, age, occupation, marriage and the like. This screen as shown indicates that the advertising aims at all types of customers and thus a "all" selection switch is selected for each of all items.

"Contact phone No." is used to input a telephone number of the advertiser to be contacted. A numeric keypad is provided on the right of a phone number display section. The advertiser touches the numeric keypad to input its own phone number. The input phone number is displayed on the phone number display section.

"Ad input method" is used to select any of scanner input and key input as means for entering advertising. In other words, it is selected whether an advertisement that the advertiser intends to offer is read by flat bed scanner 111 (scanner mode) or the advertisement is input by keys on touch panel monitor 103 (key input mode). Here, "key input" is selected and accordingly a "key input" switch is highlighted.

After input of these items, an "input completed" switch is touched and accordingly highlighted and then the screen switches to a following "key input screen."

Figure 12:
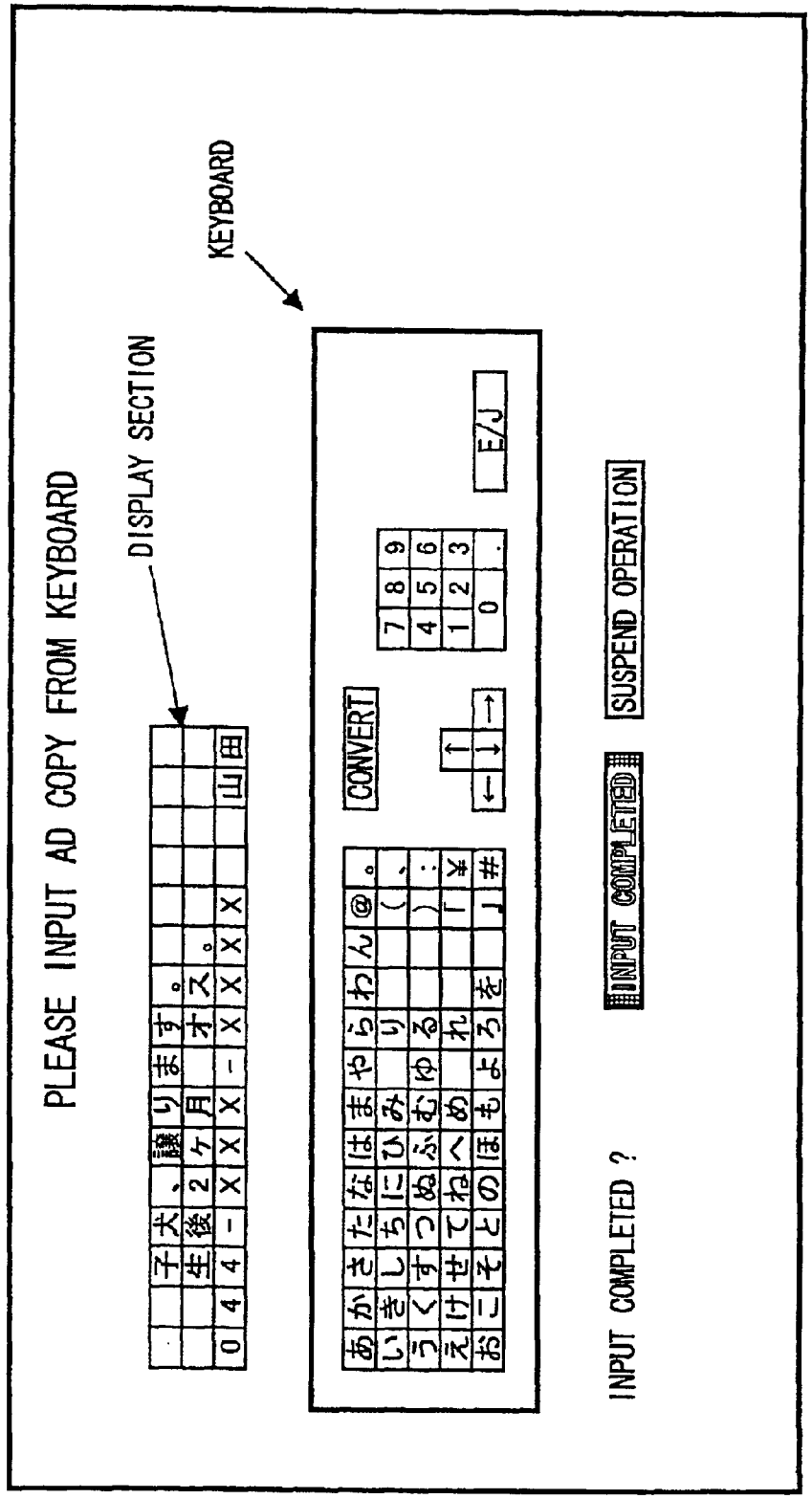
FIG. 12 shows a key input screen displayed on the touch panel monitor.

FIG. 12 shows the key input screen subsequently displayed. On the upper part of the key input screen, there is a display section indicating characters input by keys. Under the display section, a keyboard is displayed for key input. Those units corresponding to respective keys are touch switches.

In this key input mode, the advertiser can input sixteen characters in each of three rows (for Japanese) or thirty-two characters in each of three rows (for English), for a small advertisement. For a large advertisement, the advertiser can input twenty characters in each of nine rows (for Japanese) or forty characters in each of nine rows (for English).

The screen as shown is for a small advertisement. The advertiser touches the keyboard to input desired characters. Upon completion of the input operation, an "input completed" switch is pressed and accordingly a subsequent screen is displayed.

FIG. 13 shows a payment confirmation screen displayed after completion of the ad input operation. This screen includes an advertising fee (e.g. ¥1000 as shown) indicated at the top, and a message for final confirmation as to whether this fee may be charged to the credit card. If the advertiser touches an "accept" key for indicating that the advertiser would pay the fee, a subsequent final screen is displayed.

On the final screen, as shown in FIG. 14, the message "thank you" for the advertiser is displayed for a predetermined time, 10 seconds, for example. When the ten seconds have passed, the screen returns to the initial screen shown in FIG. 9.

The input ad copy may be registered after being admitted by the manager of photo kiosk apparatus 100 instead of direct registration as it is. This is because of the possibility that any malicious operator inputs ad copy contrary to public policy. Such an ad copy is prohibited from being registered and accordingly never printed on a photograph.

In order to accomplish this, a second payment confirmation screen as shown in FIG. 15 may be displayed instead of the payment confirmation screen shown in FIG. 13. Referring to FIG. 15, in addition to display of the fee, the indication to the effect that "ad contents will be examined and inserted upon approval" is provided to the advertiser for informing the advertiser of examination of the ad contents by the manager.

Further, the indication "upon approval, the fee above is charged to credit card" is provided for informing that the fee is charged to the card only if the ad passes the examination, in other words, the ad copy is actually be inserted to a print.

If an "accept" switch is pressed accordingly, all the information input by the advertiser is stored in hard disk drive 17 of photo kiosk apparatus 100.

The examination is actually carried out by a maintenance stuff of photo kiosk apparatus 100 who visits an installation site of the apparatus and reads new ad copies stored in hard disk drive 17 to examine the contents thereof. Those copies that have passed the examination by the maintenance stuff are registered in a predetermined area of hard disk drive 17 as ad copies to be inserted actually.

When a new ad copy is input, photo kiosk apparatus 100 may inform the manager of photo kiosk apparatus 100 of contents of the copy by means of facsimile or Internet 500 via a communication line. In this case, the manager transmits a result of examination from host computer 200 via a communication line to photo kiosk apparatus 100 and accordingly gives approval of the stored new ad copy. The approved new ad copy is then registered in a predetermined area of hard disk driver 17 as an ad copy to be actually inserted.

The result of examination may be conveyed to the advertiser by contacting the phone number input by the screen in FIG. 11. At this time, any auto dial device, voice synthesizer or the like may be used for allowing the computer to make a call automatically.

Figure 16:
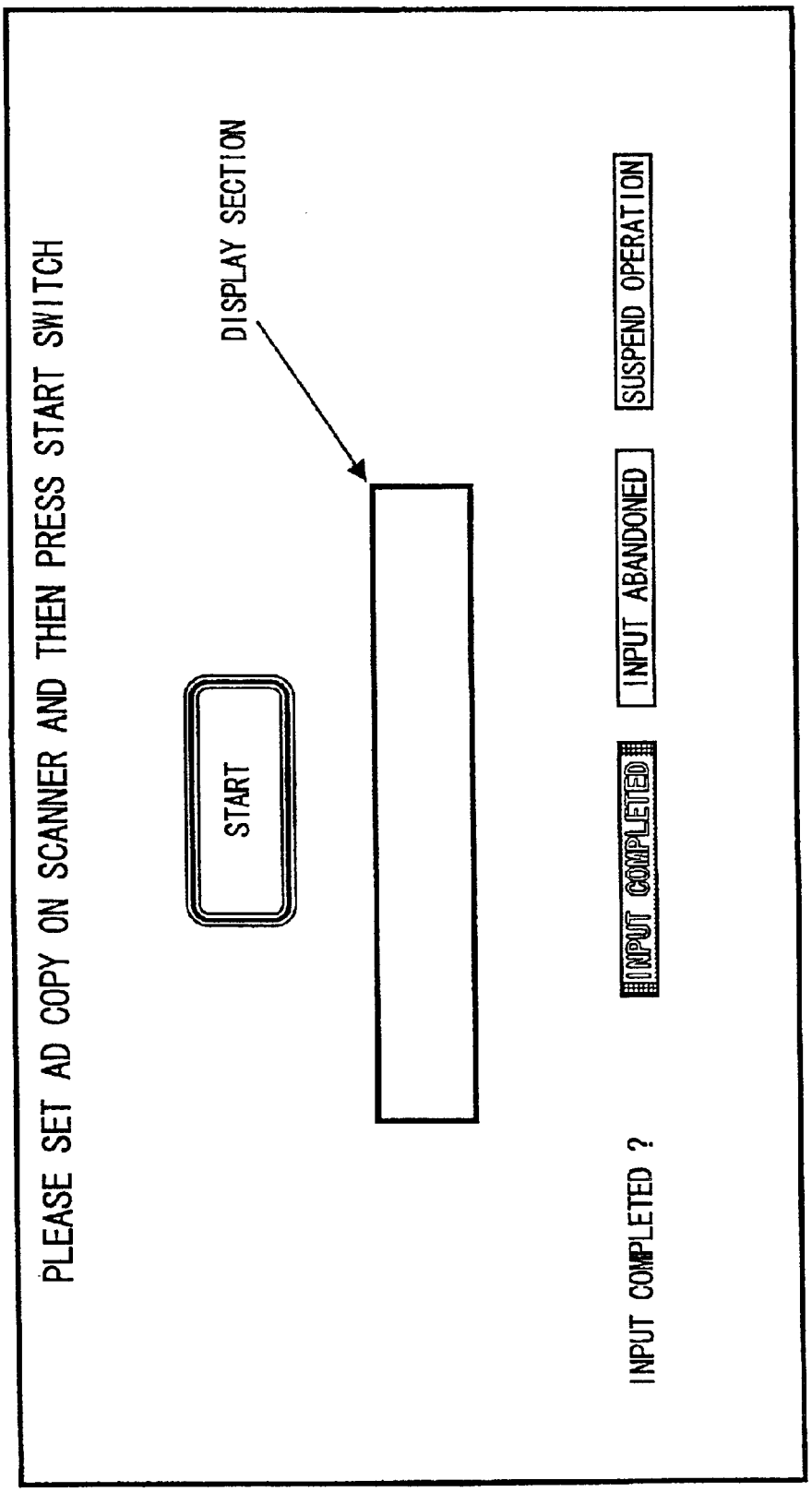
FIG. 16 a scanner input screen displayed on the touch panel monitor.

Discussion below relates to scanner input (scanner input mode) selected by the input screen in FIG. 11. FIG. 16 shows a scanner input screen displayed on touch panel 103 when the scanner input is selected. In this scanner input mode, a prepared ad slip can be read by flat bed scanner 111.

At the top of the scanner input screen, a message "please set ad copy on scanner and then press start switch" is displayed to direct the advertiser to set the prepared ad slip on the scanner and touch the "start" switch.

In the scanner input mode, an image of 60 mm×15 mm in size can be input for a small advertisement. For a large advertisement, an image of 70 mm×45 mm can be input.

When the advertiser touches the "start" switch, flat bed scanner 111 starts scanning operation to display a read image on a display section. When the scanning operation is completed, a message "input completed?" is displayed. The advertiser sees the image shown on the display section and touches an "input completed" switch if the advertiser judges that the input is completed.

If the read image have some distortion or the ad copy should be changed for some reason, an "input abandoned" switch is touched to reset the image indicated on the display section. After this, the ad slip is set on the scanner again and the "start" switch is pressed to read it again.

If the size of the ad slip prepared by the advertiser exceeds the size 15 mm×60 mm, the image read by the scanner is automatically reduced in size to the one corresponding to 15 mm×60 mm.

In the scanner mode, it is possible to enter any image which cannot be input by keys. Therefore, various ad copies can be input. This mode is also convenient for an advertiser who is not familiar with keyboard manipulation.

The following description relates to off-site application for advertising, different from the ad application done by the advertiser who visits the installation site of photo kiosk apparatus 100 for direct input. As shown in the network structure in FIG. 1, each photo kiosk apparatus 100 and host computer 200 of the manager of photo kiosk apparatus 100 are connected to Internet. The advertiser can then use its own computer (client computer 300) to access a home page of the manager to register advertising from the home page.

A method of registering advertising from a home page is now described in conjunction with FIGS. 17–22.

Figure 17:
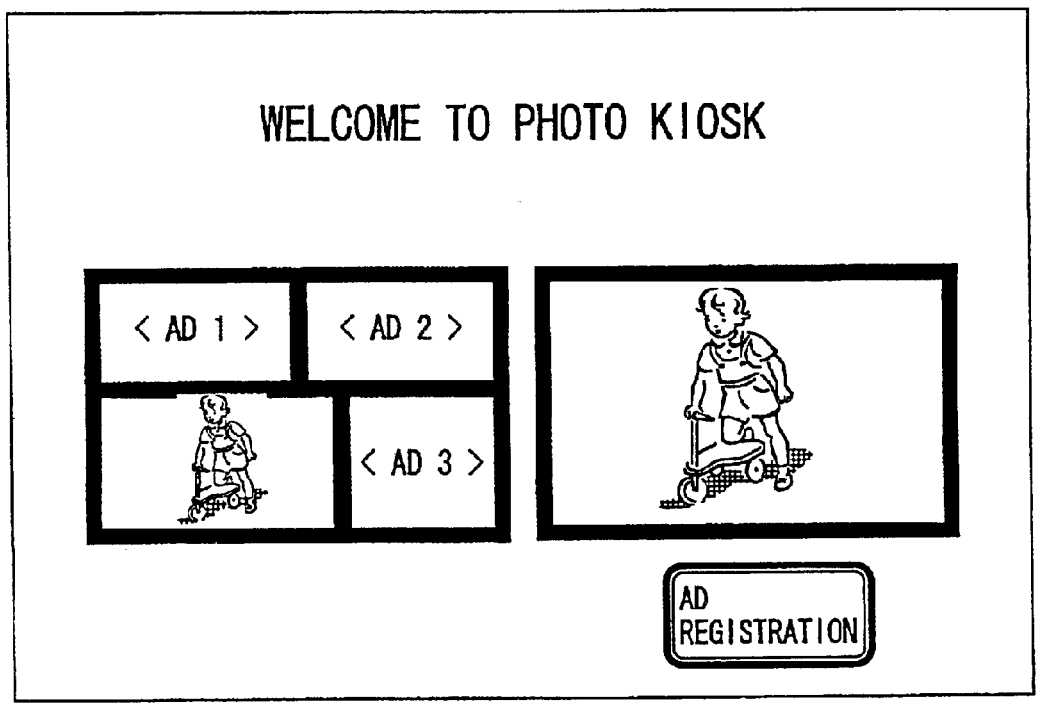
FIG. 17 shows an initial screen displayed on a client computer.
Figure 18:
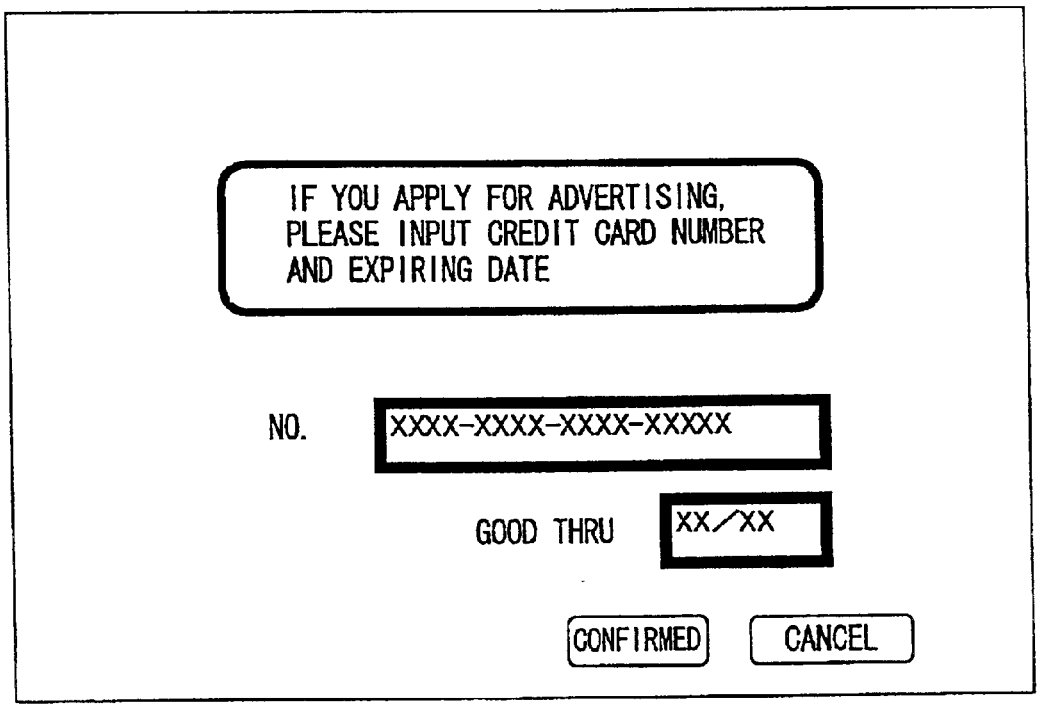
FIG. 18 shows a screen displayed on the client computer for input of credit card information.

When the home page of the manager of photo kiosk apparatus 100 is accessed, an initial screen as shown in FIG. 17 is displayed on client computer 300. The advertiser clicks an "ad registration" switch on the lower right of the screen so that the screen switches to the one shown in FIG. 18.

The advertiser is then requested to input the number of credit card and its expiring date. If the information on the credit card is not entered, this procedure cannot proceed to the next screen. Input of the credit card information and click of a "confirmed" switch causes the screen shown in FIG. 19 to be displayed.

Here, the displayed screen requests the advertiser to input request items concerning advertising. "Ad size," "print number" and "target customer" indicated as request items are similar to those shown in FIG. 11. However, an item "desired ad photo kiosk" is added.

By this "desired ad photo kiosk," location of photo kiosk apparatus 100 in which the advertiser desires to advertise is selected. Respective photo kiosk apparatuses 100 have ID numbers "001," "002," "003," . . . Each advertiser clicks any ID number to select desired photo kiosk apparatus 100.

Under the ID numbers, information on actual locations is indicated. For example, the apparatus of "005" is located in the ZZ University. A photograph of the location of the apparatus may be displayed by clicking of "ZZ University." On this screen, photo kiosk apparatus 100 of "002" is selected.

Different from the screen in FIG. 11. this screen requires input of a mail address in addition to the contact telephone number. Entered contact telephone number and mail address of the advertiser are indicated on respective display sections. After all items are input, an "input completed" switch is clicked to switch the screen to the next one.

FIG. 20 shows the screen displayed after clicking of the "input completed" switch for entering advertising copy. As shown, sixteen characters for each of the three rows (Japanese) or thirty-two characters for each of the three rows (English) can be input for a small advertisement. For a large advertisement, twenty characters for each of nine rows (Japanese) or forty characters for each of the nine rows (English) can be input. With regard to this, FIG. 20 is similar to FIG. 12.

The displayed screen as shown is for the small advertisement. After the input is completed, the "input completed" switch is clicked and then the next "payment confirmation screen" is displayed.

Figure 21:
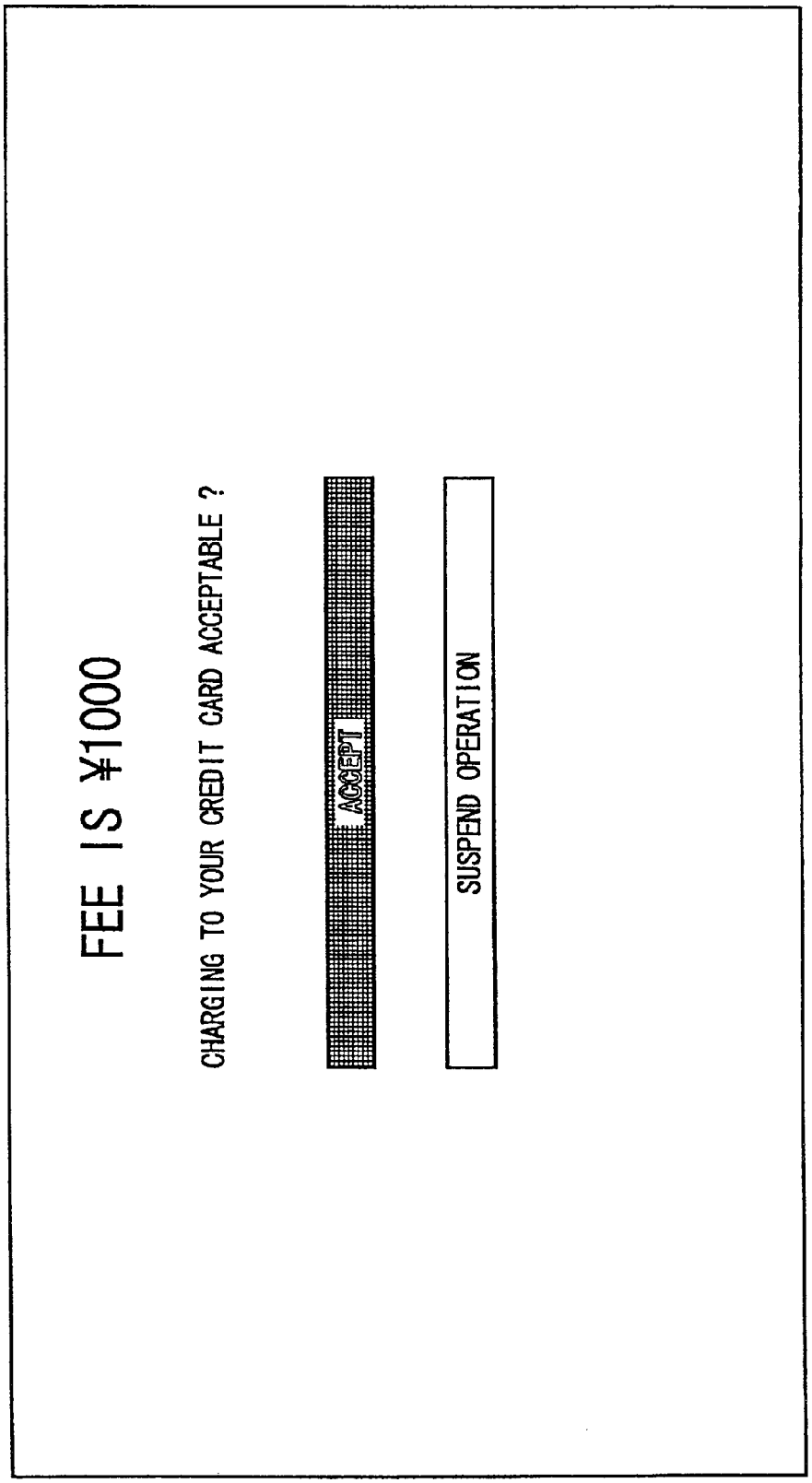
FIG. 21 shows a payment confirmation screen displayed on the client computer.

FIG. 21 shows the payment confirmation screen displayed on client computer 300 after the input is completed. This screen also shows advertising fee (e.g. ¥1000) indicated at the top, and under this, a message for final confirmation as to whether this fee may be charged to the credit card is displayed.

If the advertiser accepts charging of the fee and clicks an "accept" switch for indicating the approval, this screen switches to the final screen. Then, as shown in FIG. 14, a message like "thank you" is indicated for the advertiser.

In this way, the input ad copy is temporarily stored in the hard disk drive of host computer 200. The stored ad copy is transferred to the designated photo kiosk apparatus 100 via Internet 500 to be stored in hard disk drive 17 of that photo kiosk apparatus.

When advertising is registered through the home page, the contents of the advertising may be examined, the reason for this is as discussed above. FIG. 22 shows an example of a second payment confirmation screen in this case. On this screen, together with the fee, a message "ad contents will be examined and inserted upon approval" is indicated to inform the advertiser that the manager will examine the contents.

A message "upon approval, the fee above is charged to credit card" is also indicated to inform that only if the ad copy passes the examination, in other words, the ad copy is actually incorporated into a print, the fee will be charged to the card. When an "accept" switch is clicked, all the information entered by the advertiser is temporarily stored in the hard disk of host computer 200.

Actually, the manager carries out the examination by reading new ad copies stored in the hard disk of host computer 200. Ad copies that have passed the examination are transferred to desired photo kiosk apparatus 100 as ad copies to be inserted actually, and then registered in hard disk drive 17 thereof.

The result of examination may be informed by telephone or by an Internet mail. In the case of telephone, any auto dial device, voice synthesizer or the like may be used for allowing the computer to make a call automatically.

Advertising information thus registered by direct operation of photo kiosk apparatus 100 or through Internet 500 is stored in a predetermined area of hard disk drive 17. FIGS. 23 and 24 respectively show examples of advertising lists registered in hard disk drive 17 of photo kiosk apparatus 100.

FIG. 23 exemplarily shows a list of large advertisements registered in photo kiosk apparatus 100. Here, the registered advertisements offered by advertisers are each printed on <ad 1> area or <ad 2> area in FIG. 5.

This list includes items such as advertising number, advertiser, credit, and conditions of advertising target (sex, age, occupation, marriage). The advertising numbers represent indices of registered advertisements, specifically numbers starting from L1001. The credit is a number corresponding to the number of prints to be made that the advertiser has designated, the credit being decremented by 1 for one execution of printing. In this way, the balance of total ad print number is indicated here. The rest of items correspond respectively to conditions input by the advertiser when the advertising is registered.

FIG. 24 exemplarily shows a list of small advertisements registered in photo kiosk apparatus 100. The registered advertisements offered by advertisers each will be printed on any of <ad 3>–<ad 5> areas in FIG. 5.

This list also includes items identical to those of the large ad list shown in FIG. 23. The advertising numbers starting from S1001 are attached. Details except for this are similar to those for the large ad list.

Description is now given concerning printing by photo kiosk apparatus 100 of an image taken by a user using a digital camera.

The initial screen as shown in FIG. 9 is first displayed on touch panel monitor 103. The user then touches either the "free print" or "pay print" switch on the initial screen.

Here, if the "free print" switch is selected, a screen for input of user information as shown in FIG. 25 is displayed. As the user information, "sex," "age," "occupation" and "marriage" are indicated. These items correspond to the items for the target customer input by the advertiser in FIGS. 11 and 19.

Input of such user information is required because the information on the target customer designated by the advertiser is referred to for determining a layout of the free print. Specifically, reference is made to the user information input by the user, and then search is conducted for an advertiser targeting at such a user. Based on a result of this search, a print layout is determined that includes advertising of the advertiser thus discovered. Accordingly, it is possible to meet requests of the advertiser to the maximum.

However, requests of the advertiser could not fully be met. In this case, advertising may be employed for the user if the number of user input items with contents thereof different from those designated by the advertiser is equal to or less than a predetermined number, 2 for example.

After the personal information is input and a "completed" switch is touched, the screen as shown in FIG. 26 requesting insertion of a card or the like is displayed.

If the "pay print" switch on the initial screen is touched, the user information input screen as shown in FIG. 25 is not displayed and the screen in FIG. 26 is immediately displayed.

Referring to FIG. 26, the displayed message indicates that the user should insert any recording medium (memory card, floppy disk, CD-ROM or the like) on which recorded a file of images taken by the digital camera, into the card reader, floppy disk drive, or CD-ROM drive.

Figure 27:
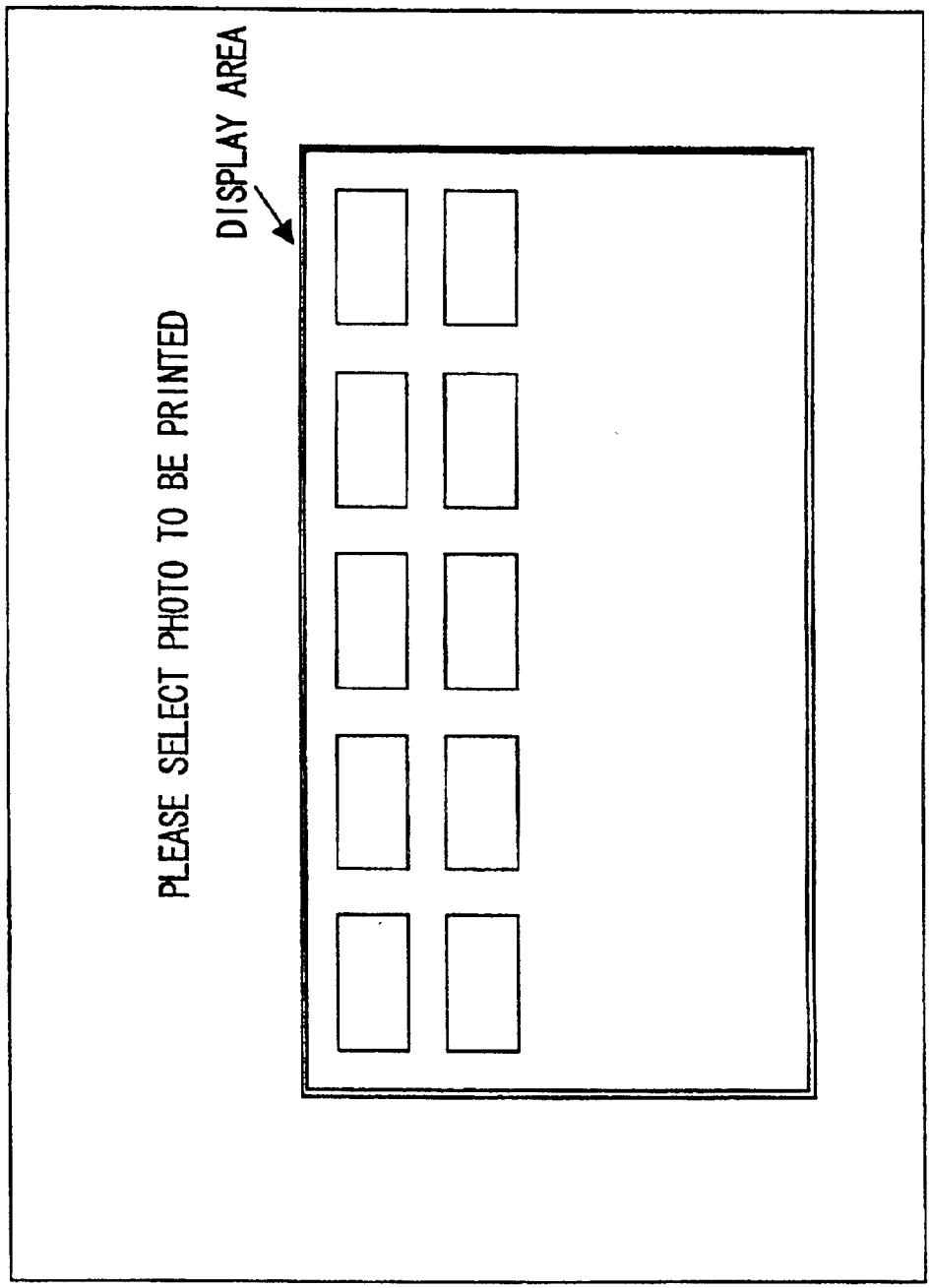
FIG. 27 shows a screen displayed on the touch panel monitor for photograph selection.

Following this message, a recording medium is inserted and then the screen shown in FIG. 27 for selecting a photograph is displayed. As shown in FIG. 27, digital images stored in the recording medium are all displayed in the display area of this screen. On the upper side of the display area, a message requesting selection of one image from the displayed images is shown.

Figure 28:
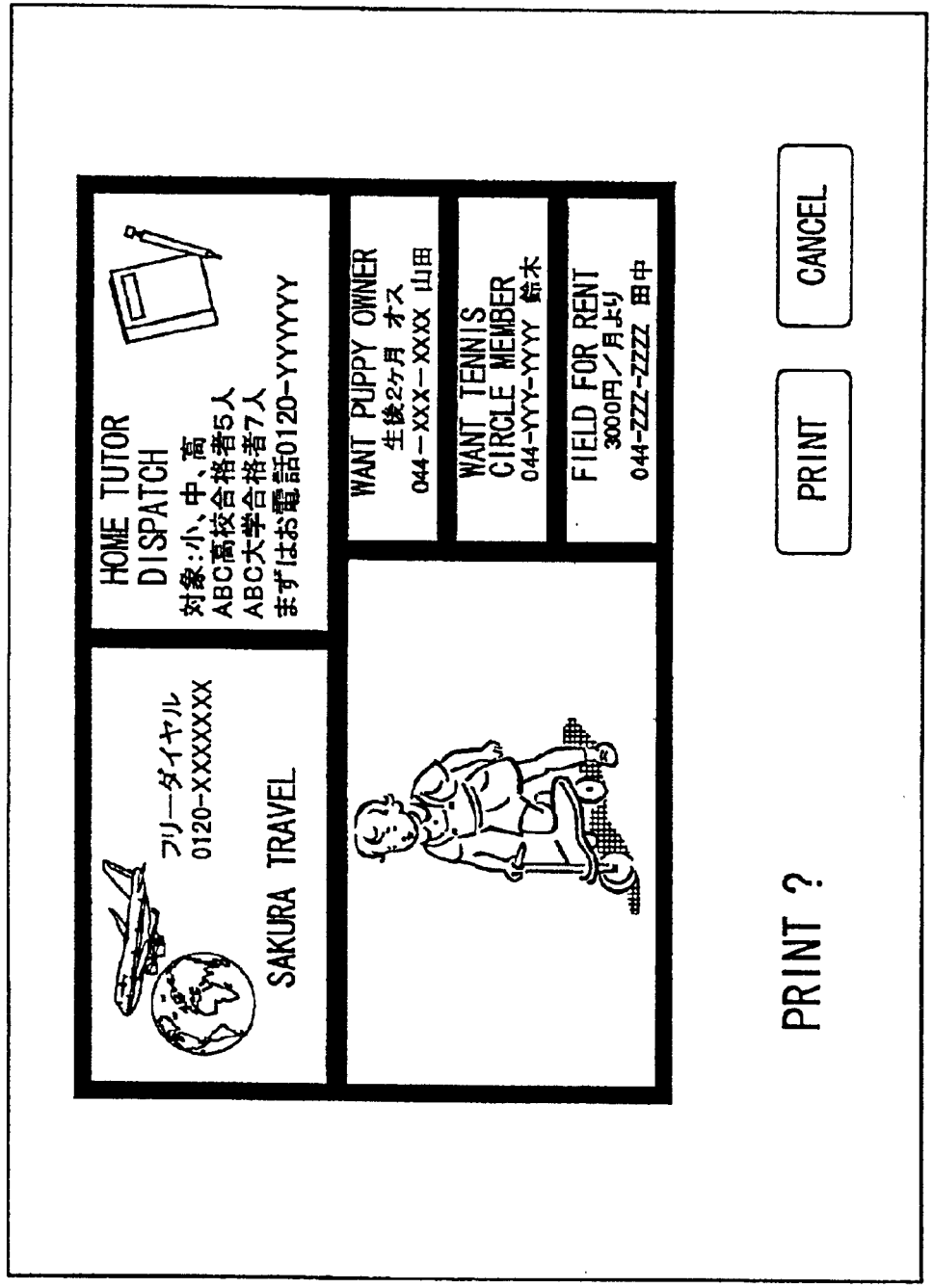
FIG. 28 shows a confirmation screen in the free print mode that is displayed on the touch panel monitor.
Figure 29:
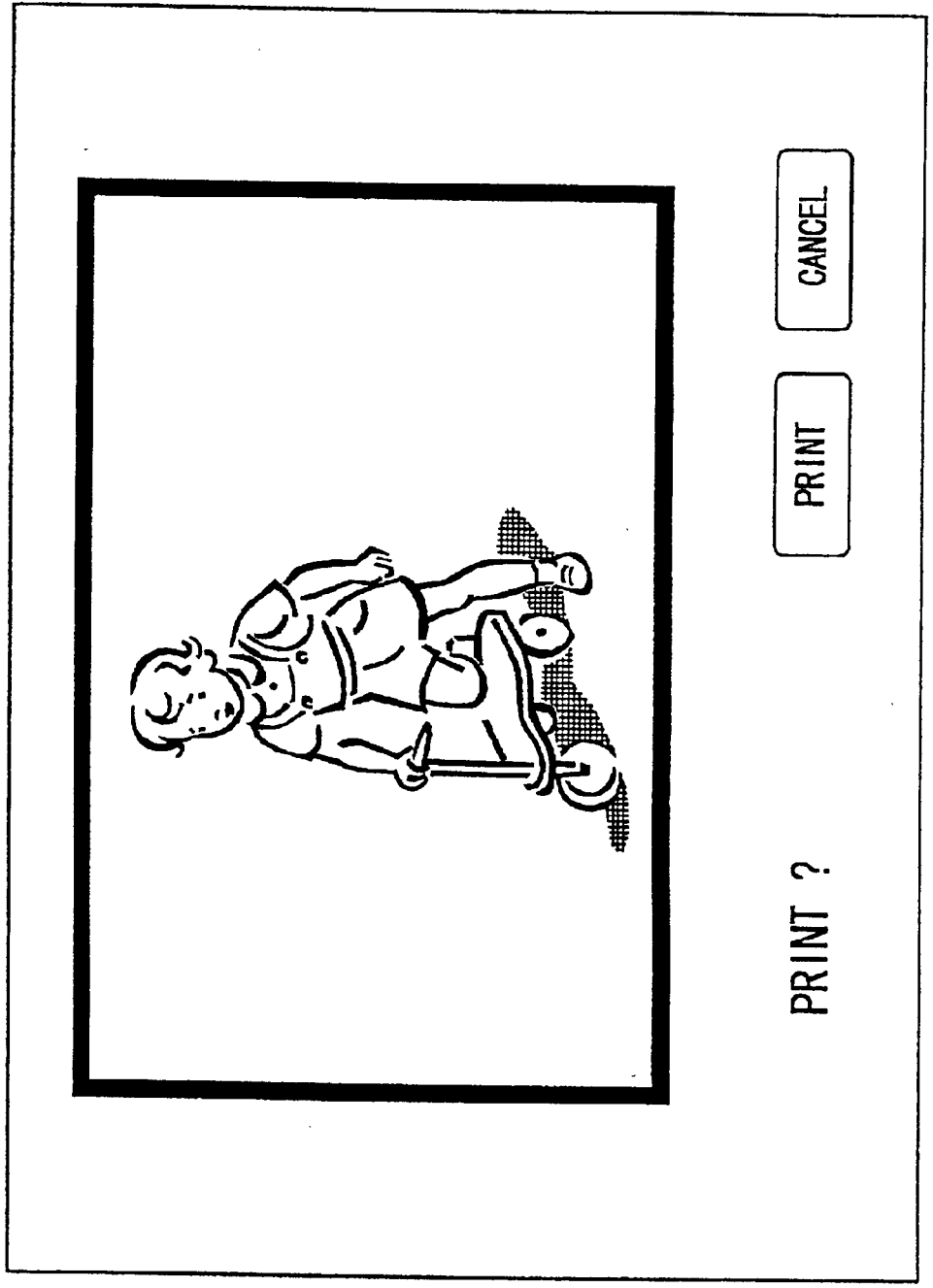
FIG. 29 shows a confirmation screen in the pay print mode that is displayed on the touch panel monitor.

When the user follows this message to touch a desired image, a confirmation screen as shown in FIG. 28 or 29 is displayed. On these screens, the full-size image to be actually printed is displayed.

FIG. 28 shows a confirmation screen in the free print mode. If the user wants printing of the displayed image, the user touches a "print" switch on the screen. If the user selects a "cancel" switch, the screen returns to the photo selection screen shown in FIG. 27.

FIG. 29 shows a confirmation screen in the pay print mode. A "print" switch is touched if printing of the displayed image is requested, and "cancel" is touched if a different image is desired. If "cancel" is selected, the screen returns to the photo selection screen shown in FIG. 27.

Figure 30:
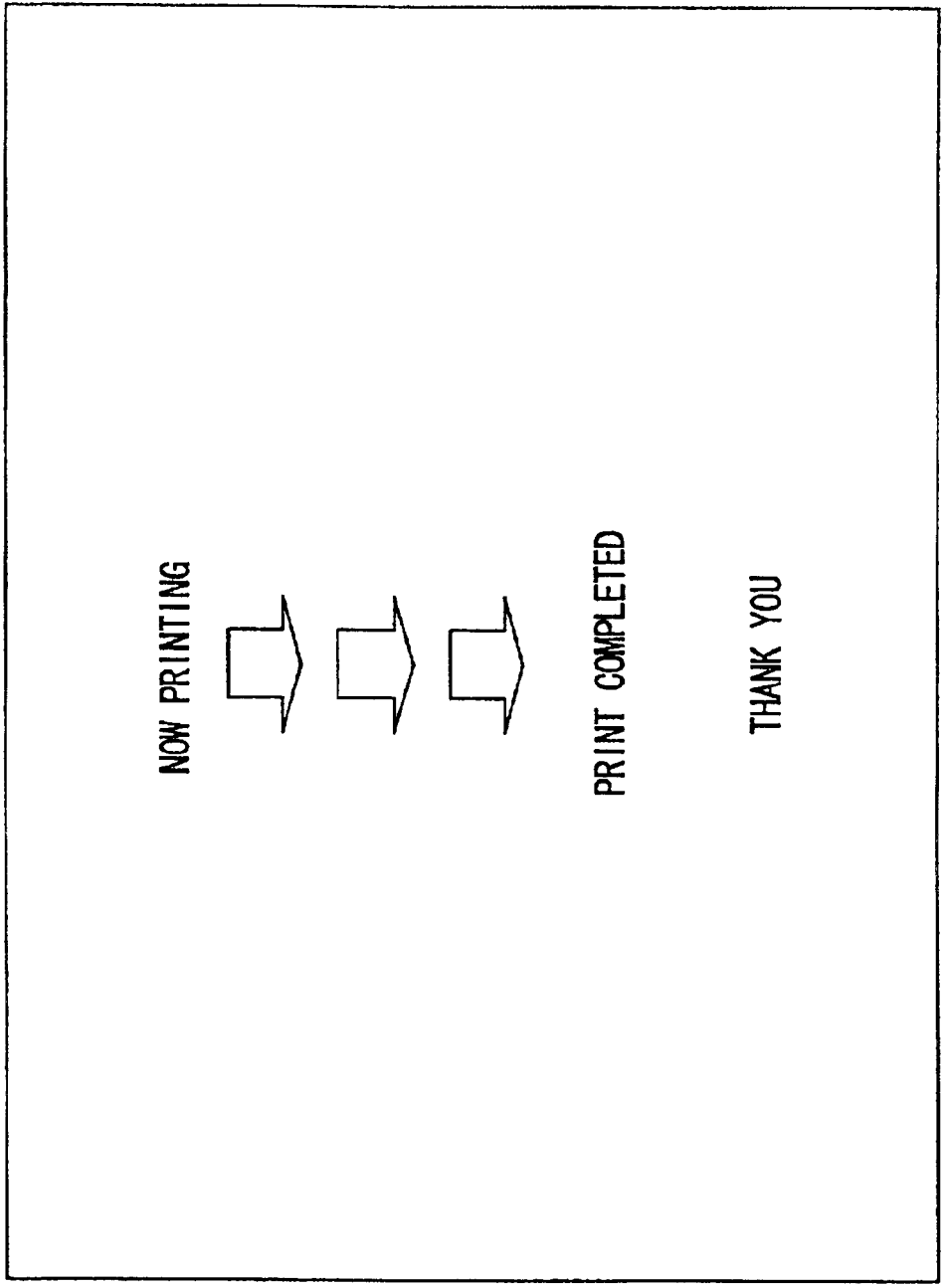
FIG. 30 shows a screen displayed on the touch panel monitor indicating that printing is in progress.

If the "print" switch is selected on the screen for confirmation of the free print mode shown in FIG. 28, the screen switches to the printing-in-progress screen shown in FIG. 30, and printing operation is then started. As the printing operation proceeds, arrows are indicated on the screen. When the printing reaches the end, messages like "printing completed" and "thank you" are indicated. This screen is displayed for a predetermined time and returns to the initial screen shown in FIG. 9.

If the "print" switch shown in FIG. 29 is pressed in the free print mode, the screen as shown in FIG. 31 is displayed for input of the print number. For example, if two prints are to be made, the switch "2" is selected. Selection of "2" causes the switch to be highlighted and simultaneously the message "Fee is ¥200. Please insert cash or credit card" is indicated to request payment of the fee.

When payment of the fee or insertion of a valid credit card is confirmed, the print-in-progress screen shown in FIG. 30 is displayed and printing is started. After this, similarly to the free print mode, arrows are successively indicated and messages like "printing is completed" and "thank you" are displayed. Finally, the screen returns to the initial screen in FIG. 9.

The printing operation discussed above is for the case in which no limitation is imposed on the free print. Two printing operations that are limited in the free print are described below.

In the first case, the free print is limited according to the number of advertisers and balance of credit. The printing cost in the free print mode is paid by advertisers. Therefore, if the printing cost exceeds the amount payable by the advertisers, the free print must be inhibited. Then, according to the number of advertisers and balance of credit, the free print is restricted.

Figure 32:
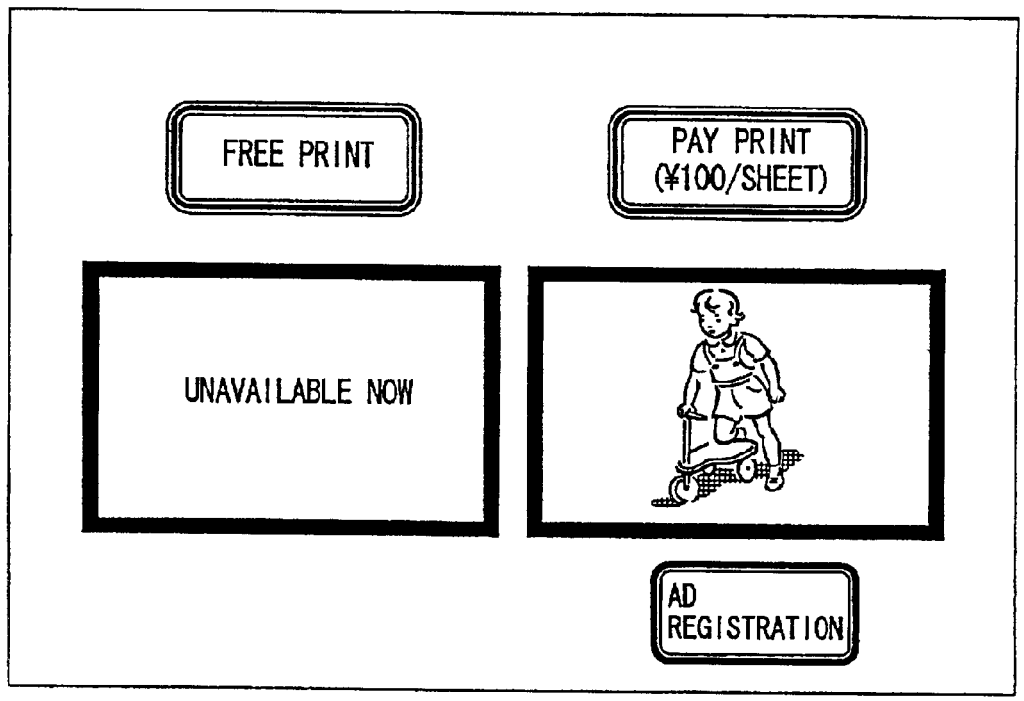
FIG. 32 shows an initial screen displayed on the touch panel monitor indicating that the free print mode is unavailable.

For example, the free print is allowed if there are at least two advertisers offering large advertisements with a credit balance of at least 1 as well as at least three advertisers offering small advertisements with a credit balance of at least 1. Otherwise, the free print is inhibited and the screen switches to an initial screen as shown in FIG. 32 instead of the initial screen shown in FIG. 9. As shown in FIG. 32, the message "unavailable now" is indicated on the sample display portion under a "free print" key.

By such an indication, use of the free print can appropriately be inhibited. In this way, it is possible to provide a proper service meeting the advertising cost (printing cost) paid by advertisers and smoothly manage the photo kiosk apparatuses.

If the number of advertisers does not reach a predetermined number, discount printing may be provided by printing reduced photo images on some of ad areas, instead of inhibition of the free print mode itself.

Figure 33:
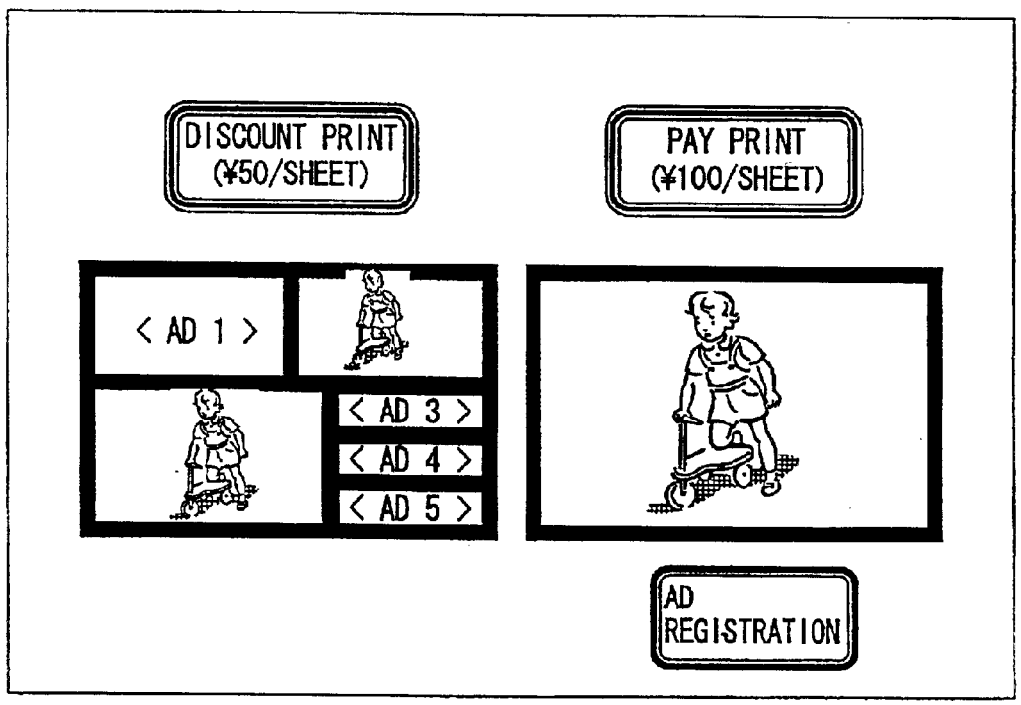
FIG. 33 shows an initial screen displayed on the touch panel monitor with the fee changed.

FIG. 33 exemplarily shows an initial screen enabling a discount print to be made. For example, if there is one advertiser offering a large advertisement, a "discount print" key as shown is indicated instead of "free print." As a sample, a reduced photo image is printed on the ordinary <ad 2> area. The fee here is ¥50 per sheet for example. If a reduced image is also printed on the area <ad 5>, in addition to the one printed on <ad 2>, the fee is ¥60 per sheet.

The printing cost is determined such that the greater the number of advertisements to be printed, the lower the printing fee to be charged. By such a charging system, users can obtain prints for a smaller fee than that in the pay print. Consequently, this is more advantageous than the absolute inhibition of the free print. Advertisers registering advertisements also have more advantages compared with the case in which advertisements are not printed until the registered number reaches a predetermined number as a whole.

In the second case, the free print is limited for the same user. In the free print mode, the free charge could induce printing out of malice. Further, one user may produce a great number of prints. Such printing is against intention of advertisers and thus should desirably be prevented. Limitation is accordingly imposed to some extent as explained below.

For example, the number of prints for the same photograph is limited to five, or the number of prints from the same recording medium is limited to five.

If a user selects the free print under the condition exceeding the limitation above, a free print inhibition screen shown in FIG. 34 is displayed. Here, the message indicates that the free print on the current day is unavailable. This free print inhibition screen may be displayed after the screen requesting card insertion shown in FIG. 26, or displayed after the photo selection screen shown in FIG. 27.

The free print is limited by counting up the number of free prints for the same user using a counter. Specifically, a subsequent free printing is limited when the counter indicates the upper limit, for example five.

Although the number of free prints is herein limited to five, the number may be changed depending on the number of advertisers. For example, the number may be limited to ten if the number of advertisers offering large advertisements and that offering small advertisements are each at least 10 and less than 15, and the number may be unlimited if respective numbers of advertisers are each at least 15.

A flow of processing by photo kiosk apparatus 100 according to this embodiment is hereinafter described in conjunction with FIGS. 35–40.

Figure 35:
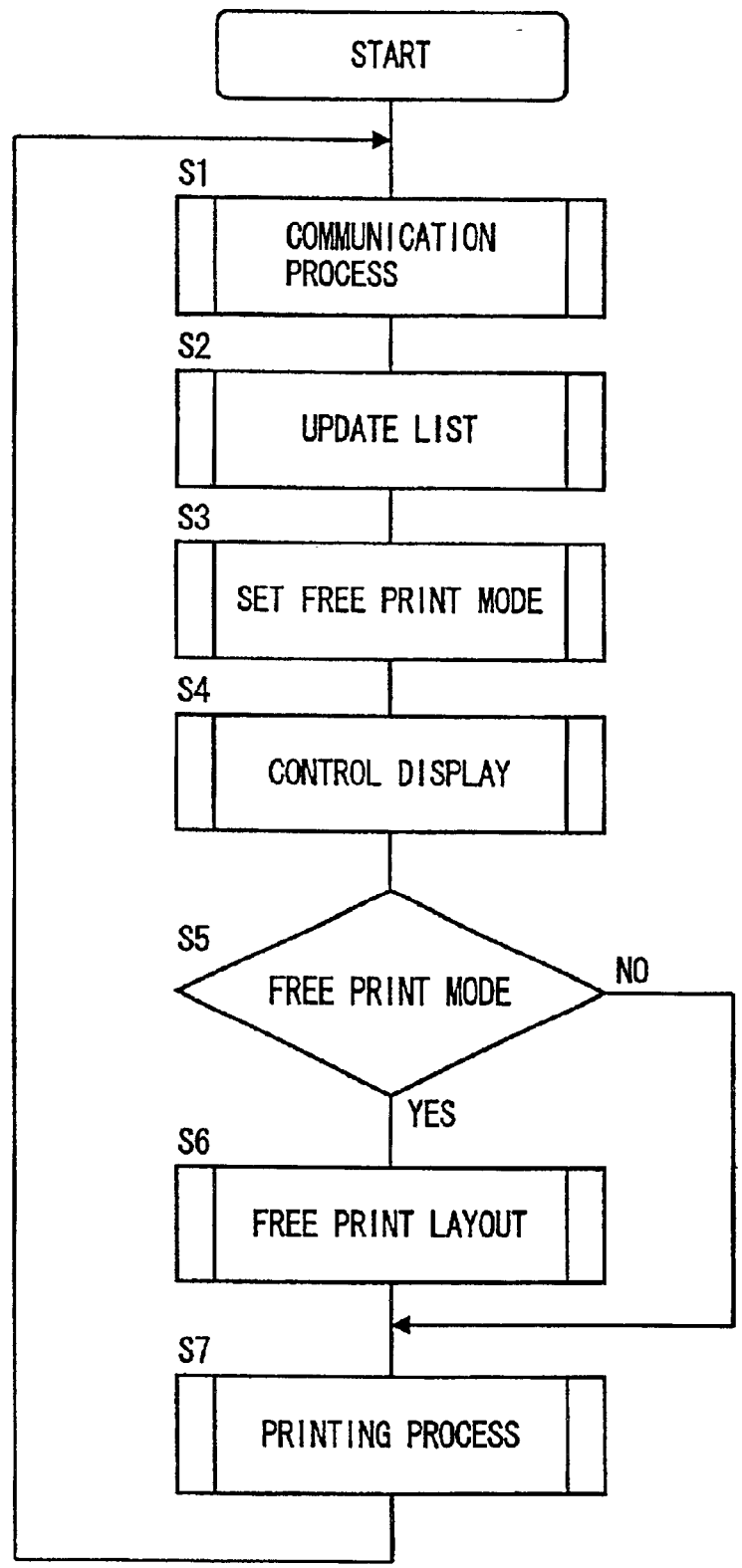
FIG. 35 is a flow chart showing a flow of an entire process of the photo kiosk apparatus.

FIG. 35 is a flowchart showing an entire processing by photo kiosk apparatus 100. Referring to FIG. 35, photo kiosk apparatus 100 first communicates with host computer 200 at a predetermined timing in step S1. Through this communication, addition of a new advertising copy, permission to insert the new advertising copy, for example, are informed.

Next in step S2, a process of updating a list is carried out. Specifically, a new ad copy directly input from photo kiosk apparatus 100 or input via Internet 500 from host computer 200 is added to the large ad list in FIG. 23 or the small ad list in FIG. 24.

In step S3, a process of setting the free print mode is conducted. Here, based on advertising information registered in hard disk drive 17, whether or not the free print mode is permitted is determined.

In step S4, the display is controlled. Here, display control of touch panel display 103 of photo kiosk apparatus 100 as well as screen switching control are carried out. In other words, following selection by an operator, insertion of a memory card or the like, entering of fee, and the like, contents displayed on touch panel monitor 103 are changed.

In step S5, determination is made on whether or not the user selects the free print mode. If the free print mode is selected, a free print layout process is performed in step S6. A layout of a photo image and advertising images to be printed on the same print sheet is then specifically determined.

After the layout is determined, a printing process is carried out in step S7. For the free print mode, a digital camera image and advertising copy are printed on the print sheet according to the determined layout.

If the free print mode is not selected in step S5, i.e., the pay print mode is selected, step S6 is skipped and the printing process in step S7 is performed. In this case, only the digital camera image is printed on the print sheet.

After the printing process is completed, the communication process in step S1 is conducted again. The processes above are thereafter repeated. Those processes as explained above constitute the entire processing flow of photo kiosk apparatus 100.

Each of the processes is hereinafter described in detail.

Figure 36:
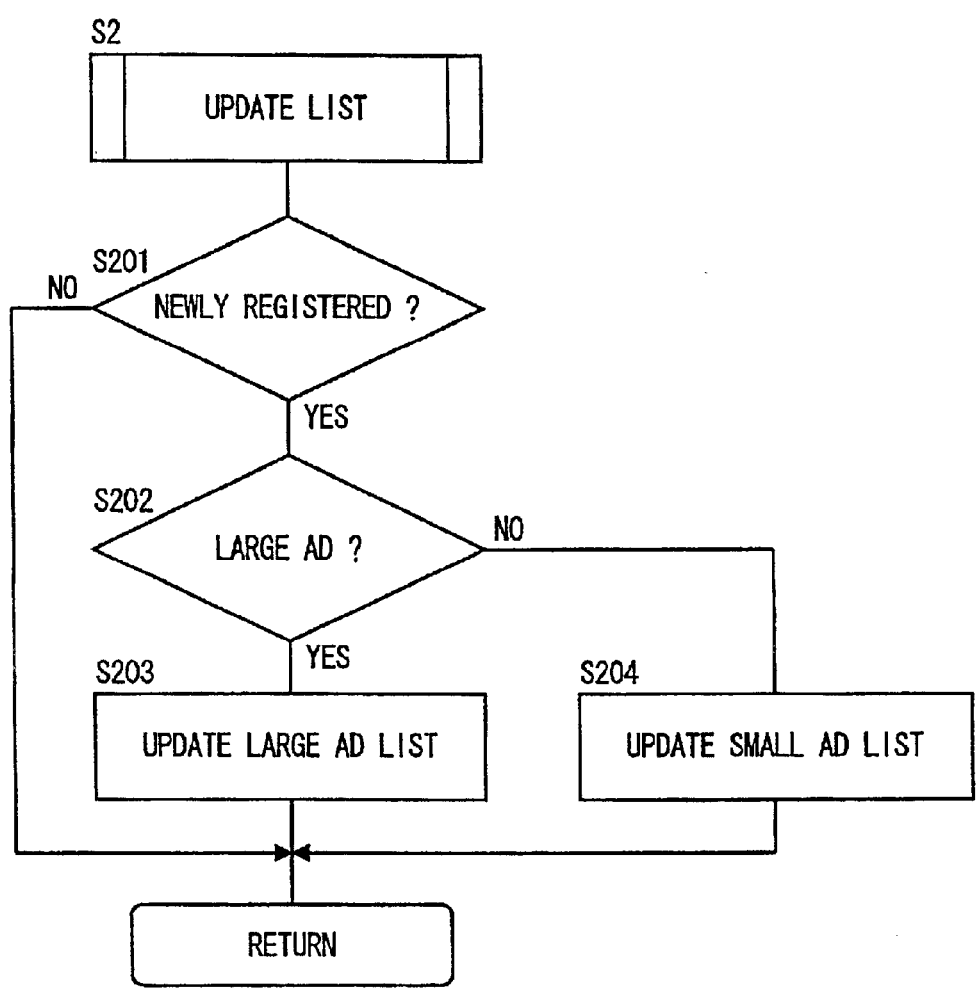
FIG. 36 is a flow chart showing in detail a flow of the list update process (step S2) in FIG. 35.

FIG. 36 is a flowchart showing in detail a flow of the list update process (step S2) in FIG. 35. Referring to FIG. 36, in step S201, whether an advertising copy is newly registered or not is determined. Specifically, determination is made on if a new advertising copy is directly input from photo kiosk apparatus 100 or input via Internet 500.

If a new advertising copy is registered by means of any of the input methods, whether the new advertising is a large advertisement or a small advertisement is decided in step S202. If the new ad is a large one, thorough the process in step S203, that information is added to the large ad list shown in FIG. 23 to update the list. For a small advertisement, in step S204, the new small advertisement is added to the small ad list shown in FIG. 24 to update the list.

Update of the large or small ad list is accordingly accomplished to leave this sub routine and return to the main routine in FIG. 35.

In step S201, if the determination indicates that no advertising is newly registered, the processes from step S202 to step S204 are skipped and then the subroutine is completed.

Figure 37:
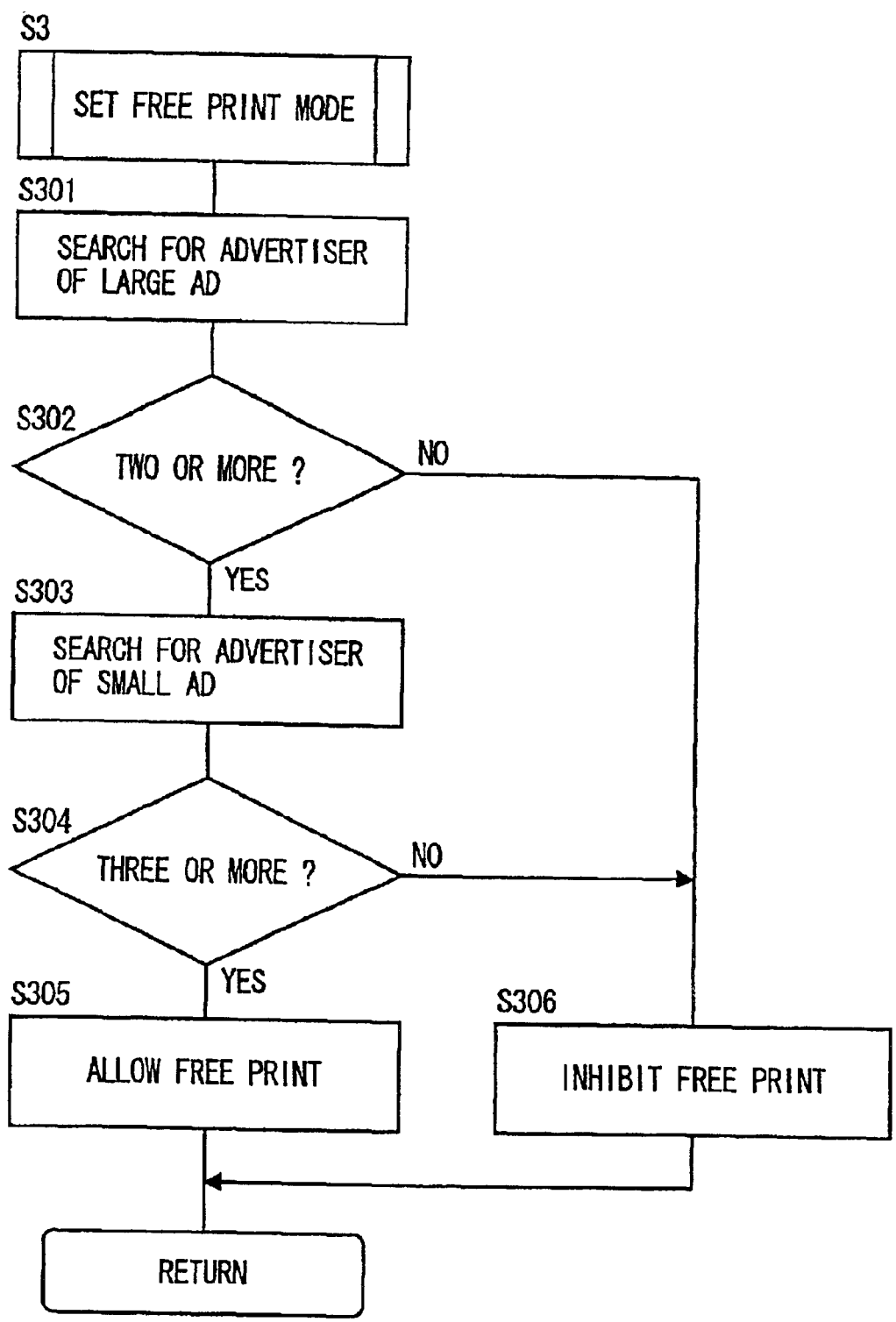
FIG. 37 is a flow chart showing in detail a flow of the free print mode setting process (step S3) in FIG. 35.

FIG. 37 is a flowchart showing in detail a flow of the free print mode setting process (step S3) in FIG. 35. Referring to FIG. 37, in step S301, search is conducted through the large advertising list registered in hard disk drive 17.

In step S302, following a result of the search, it is determined whether or not the large ad list contains at least two advertisers of large advertising with credit of at least 1. If this determination indicates that at least two such large ad advertisers are not present, the process in step S306 is performed to inhibit the free print.

In step S302, if the determination indicates that at least two such large ad advertisers are present, in the process of step S303, search is conducted for advertisers of small advertising. Specifically, the search is made through the small ad list registered in hard disk drive 17.

In step S304, whether or not at least three small ad advertisers with credit of at least 1 are present is checked. If at least three such small ad advertisers are not present, in the process of step S306, the free print is inhibited.

On the contrary, if there are at least three such small ad advertisers are present, in the process of step S305, the free print is permitted.

After the permission of the free print in step S305 or the inhibition of the free print in step S306, this subroutine is completed to return to the main routine in FIG. 35.

According to the processes described above, only if there are at least two large ad advertisers with credit of at least 1 as well as at least three small ad advertisers with credit of at least 1, the free print mode is allowed. Otherwise, free printing in the free print mode is inhibited.

The free print is accordingly permitted only if the printing cost in the free print mode is within a range of amount payable by advertisers, and thus a proper printing service is provided.

If the number of large ad advertisers and that of small ad advertisers do not meet the specified ones, discount printing can be set, if not charge free, that charges less fee than that of the regular pay print.

Figures 38, 39:
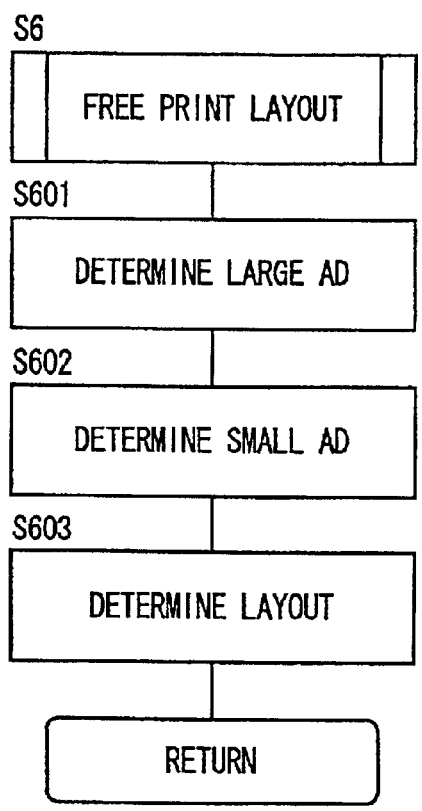
FIG. 38 is a flow chart showing in detail a flow of the free print layout process (step S6) in FIG. 35.
FIG. 39 exemplarily shows combinations of registered advertisements.

FIG. 38 is a flowchart showing in detail a flow of the free print layout process (step S6) in FIG. 35. Referring to FIG. 38, in the free print layout process, large advertisements to be printed on a print sheet are determined in step S601. Then, in step S602, small advertisements to be printed on the same sheet are determined.

It is supposed here as one example that the large ad list includes six large advertisements L1001–L1006 registered therein and the small ad list includes six small advertisements S1001–S1006 registered therein.

FIG. 39 shows a combination of registered advertisements as an example. As shown, for large ad areas <ad 1> and <ad 2>, large advertisements L1001–L1006 are combined in sequence. For small ad areas <ad 3>–<ad 5>, small advertisements S1001–S1006 are combined in sequence.

A combination of advertisements is changed for each printing. For example, according to the combinations shown in FIG. 39, the combination is changed such that advertisements L1001, L1002, S1001, S1002 and S1003 are inserted in the first free print on the day, advertisements L1002, L1003, S1002, S1003 and S1004 are inserted in the second print, and so on.

It is noted that combinations are not limited to those mentioned above and may be determined by generating random numbers.

Large and small advertisements to be employed for respective advertising areas are determined in this manner. Next in step S603, advertising copies registered correspondingly to respective ad contents are read from hard disk drive 17 and the layout is completed.

After the free print layout process, the subsequent printing process (step S7) is carried out.

Figure 40:
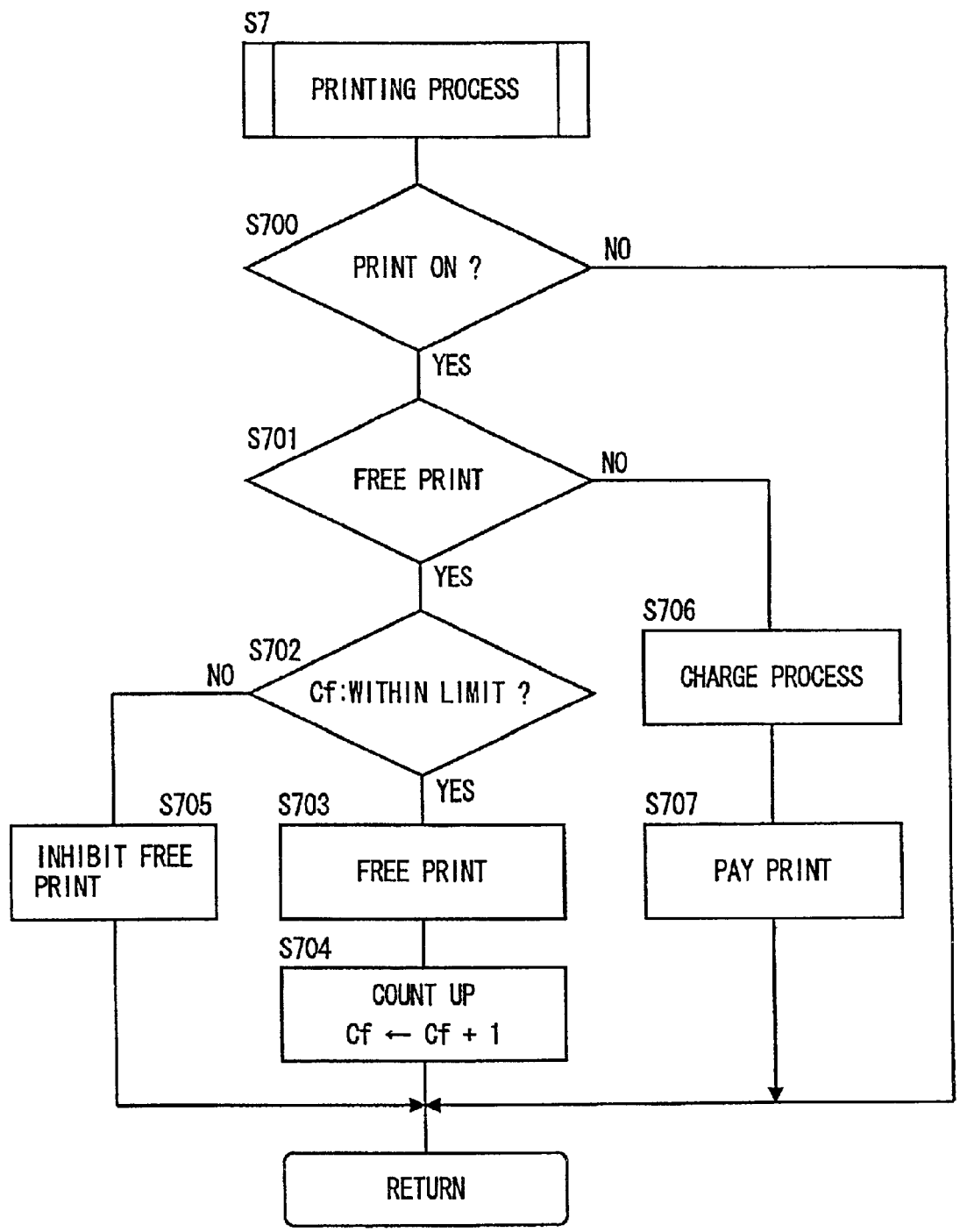
FIG. 40 is a flow chart showing in detail a flow of the printing process (step S7) in FIG. 35.

FIG. 40 is a flowchart showing in detail the printing process (step S7) in FIG. 35. Referring to FIG. 40, in step S700, it is judged whether or not a user touches the print switch.

If the print switch is not touched, this sub routine is terminated without the processes described below. If the print switch is touched, in step S701, whether the touched print switch is the "free print" switch or "pay print" switch is decided.

If the decision indicates that the touched switch is the "free print" switch, step S702 is performed and step S706 is performed if the touched switch is the "pay print" switch.

In step S702, it is determined whether a value of a counter Cf indicating the number of prints produced from the same recording medium is within a limit. If the value of counter Cf is within the limit, free printing is carried out in step S703. After this, in step S704, the value of counter Cf is counted up.

The value of counter Cf is reset, for example, when that recording medium is removed from photo kiosk apparatus 100. The reset of the counter may be performed after a predetermined time from printing, for example, after 12 hours.

In step S702, if it is determined that the value of counter Cf exceeds the limit, step S705 is performed to inhibit free printing.

In this way, the number of prints for the same user in the free print mode is limited to meet the intention of advertisers registering advertisements in expectation of providing effective advertising.

Specifically, the limitation is imposed such that the number of prints for the same photograph is limited to five, or prints must be produced from the same recording medium only. In order to judge if the photograph is the same one or a different one, or if the recording medium is the same one or a different one, information about the date stored together with a photo image, camera, and the like are used.

In step S706, the user is asked to pay for prints by cash or credit card in the pay print mode. Entered cash or credit card is checked to confirm payment of a predetermined fee. After this, in step S707, a desired number of pay prints are produced.

After this printing process, the main routine shown in FIG. 35 is followed to repeat the processes (step S1–step S7) described above.

As heretofore discussed, photo kiosk apparatus 100 according to this embodiment eliminates the problem concerning cost by employing the free print mode for printing an image taken by a digital camera with a high quality, and accordingly a printed image can be provided at no charge or a small charge.

For advertisers, it is possible to provide advertising efficiently to selected targets at a low rate.

A certain limit is imposed on the free printing to offer an appropriate printing service and smoothly utilize photo kiosk apparatus 100.

Such a system may be applicable not only to photo kiosk apparatus 100 but to copying machines, for example. If the system is applied to a copying machine, an image of an original document is printed on the front and an advertising copy is printed on the back. Alternatively, the original image may be reduced to 90% to allow an advertising copy to be printed around the image.

Although an image recorded on a recording medium is printed in this embodiment, printing is not limited to this. A video camera may be installed in photo kiosk apparatus 100 to print an output of the camera. Then, photographs used for identification, commemorative photographs, and the like can be printed for free.

In this embodiment, advertising copies are printed on a print sheet together with a photo image. However, the copies may be indicated on a display (touch panel monitor 103) when photo kiosk apparatus 100 is not in use.

Although photo kiosk apparatus 100 in this embodiment is connected to network 500, the apparatus may be of the stand-alone type.

Print sheets used in photo kiosk apparatus 100 are not limited to regular photo sheets and may be any photo sheet made of sticker.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image output system comprising:

a registration unit registering sub image data from an advertiser;

an acquisition unit acquiring main image data from a user;

a reception unit receiving a print output request;

a first output unit according to said received print output request to print out said acquired main image data and said registered sub image data on the same medium;

a decision unit deciding whether a predetermined number of sub image data are registered in said registration unit; and a limitation unit limiting the printing out by said first output unit if said decision unit decides that the predetermined number of sub image data are not registered in said registration unit.

2. The image output system according to claim 1, wherein said print output request received by said reception unit includes the number of sub image data printed out together with said main image data by said first output unit, and said first output unit prints out said sub image data together with said main image data according to said number of sub image data.

3. The image output system according to claim 2, further comprising a charging unit charging a fee to the user, said charging unit charging the fee according to said number of sub image data printed out by said first output unit.

4. The image output system according to claim 1, further comprising a second output unit printing out only said acquired main image data.

5. The image output system according to claim 4, further comprising a charging unit charging a fee to the user, said charging unit charging for printing out by said second output unit a fee greater than a fee charged for printing out by said first output unit.

6. The image output system according to claim 1, wherein information about whether output is allowed or not is attached to said registered sub image data, and said sub image data printed out by said first output unit has attached information to allow output.

7. An image output system comprising:

a registration unit registering sub image data from an advertiser;

a limit information acquisition unit acquiring information about limitation on printing out regarding said registered sub image data;

a main image data acquisition unit acquiring main image data from a user;

a reception unit receiving a print output request;

an output unit according to said received print output request to print out said acquired main image data and said registered sub image data on the same medium;

a decision unit deciding whether the printing out by said output unit is within a range of said acquired information about limitation on printing out; and a limitation unit limiting the printing out by said output unit if said decision unit decides that the printing out is out of the range of the information about limitation.

8. The image output system according to claim 7, wherein said information about limitation acquired by said limit information acquisition unit includes the number of times the printing out is performed by said output unit.

9. The image output system according to claim 7, further comprising a charging unit charging a fee to the advertiser, said charging unit charges the fee according to said acquired information about limitation.

10. An image output system comprising:

a registration unit registering sub image data from an advertiser;

an acquisition unit acquiring main image data from a user;

a reception unit receiving a print output request;

a first output unit according to said received print output request to print out said acquired main image data and said registered sub image data on the same medium;

a decision unit deciding whether the number of times the printing out by said first output unit is performed for the same user reaches a predetermined number; and a limitation unit limiting the printing out by said first output unit if said decision unit decides that the predetermined number is reached.

11. The image output system according to claim 10, further comprising a receptacle unit receiving a recording medium with main image data recorded thereon, wherein said acquisition unit acquires main image data from said recording medium received by said receptacle unit, and when said acquired main image data is acquired from the same recording medium received by said receptacle unit, said decision unit recognizes that the main image data is from the same user and decides whether the number of times the printing out is performed reaches the predetermined number based on the recognition.

12. The image output system according to claim 10, further comprising a second output unit printing out only said acquired main image data on the medium, wherein when the printing out by said first output unit is limited by said limitation unit, printing out is performed by said second output unit.

13. The image output system according to claim 12, further comprising a charging unit charging a fee to the user, said charging unit charges for printing out by said second output unit a fee greater than a fee charged for printing out by said first output unit.

* * * * *